Dec. 30, 1924.

W. G. JOPSON 1,521,242

TAG STRINGING MACHINE

Filed Aug. 16, 1920     15 Sheets-Sheet 1

Inventor
W. G. Jopson

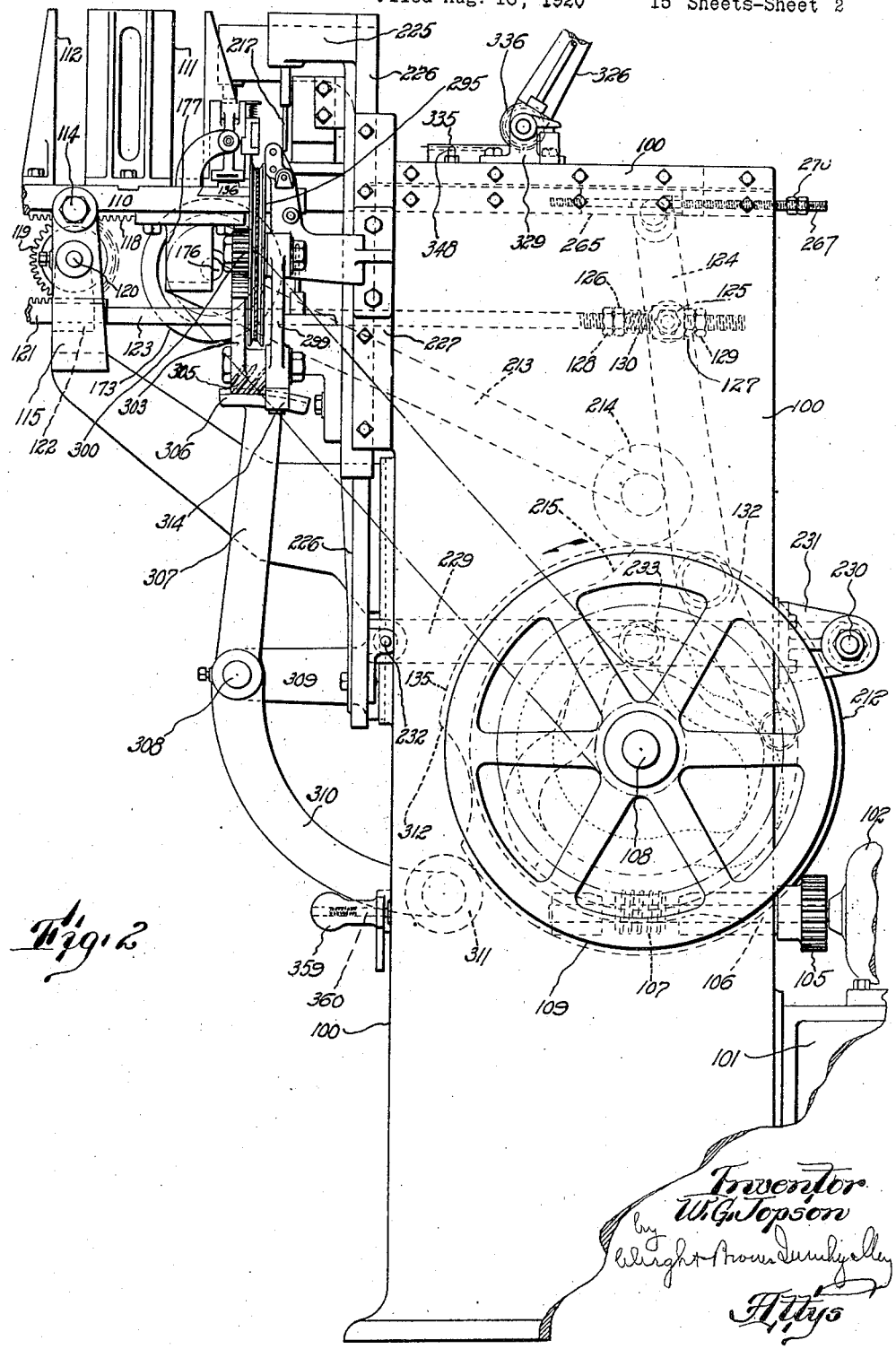

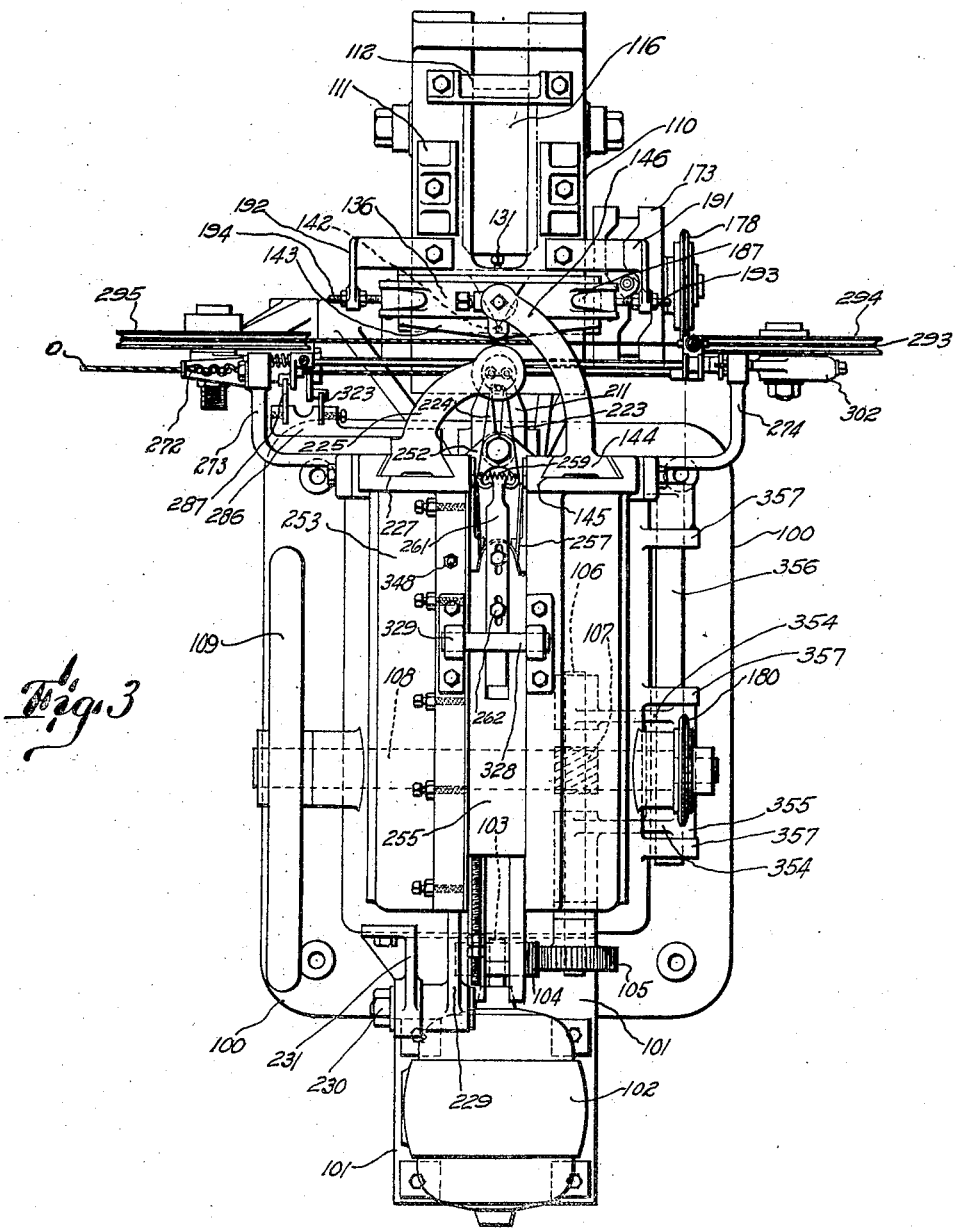

Dec. 30, 1924.
W. G. JOPSON
1,521,242
TAG STRINGING MACHINE
Filed Aug. 16, 1920     15 Sheets-Sheet 4
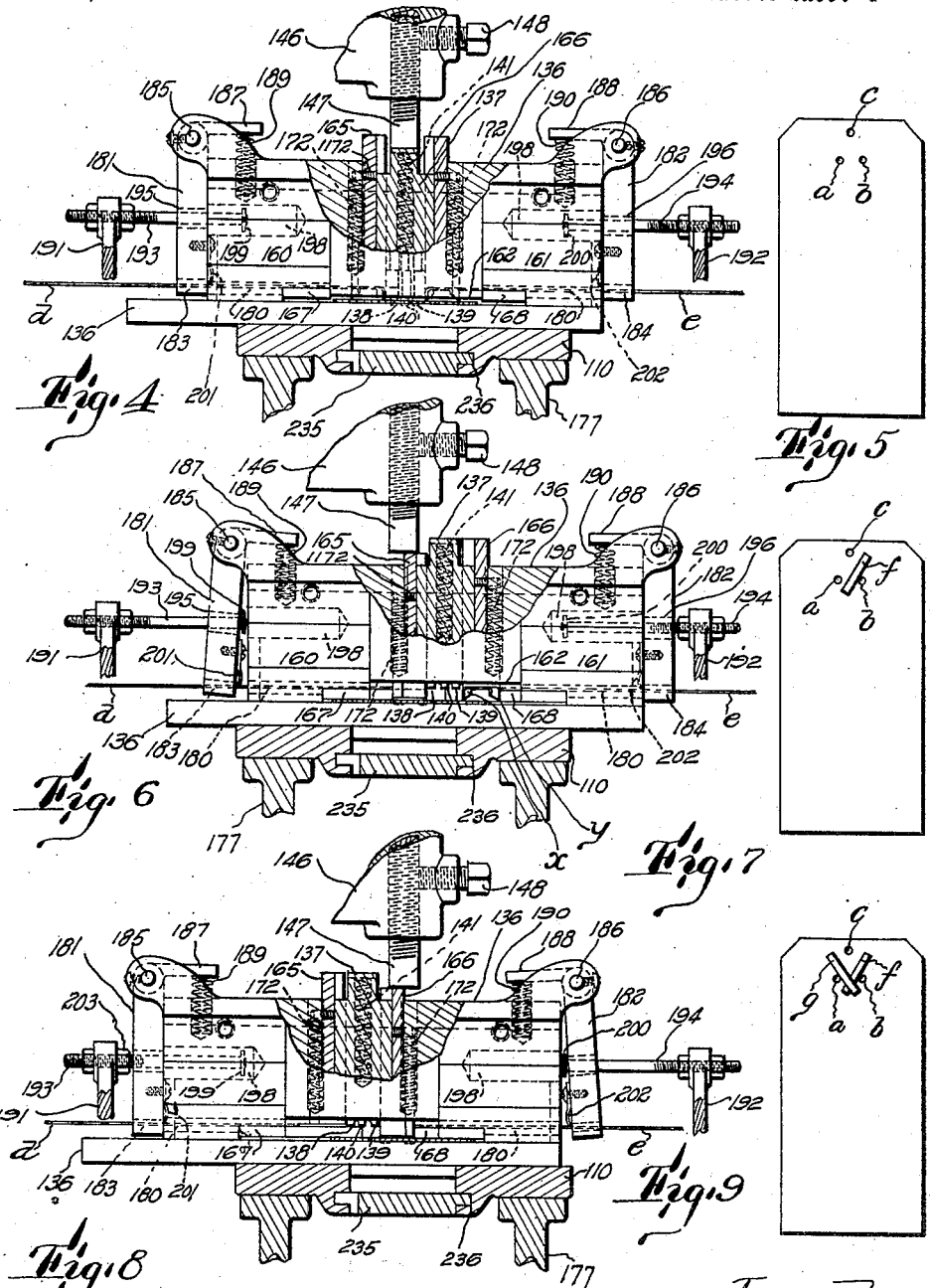

Dec. 30, 1924.  
W. G. JOPSON  
1,521,242  
TAG STRINGING MACHINE  
Filed Aug. 16, 1920   15 Sheets-Sheet 5
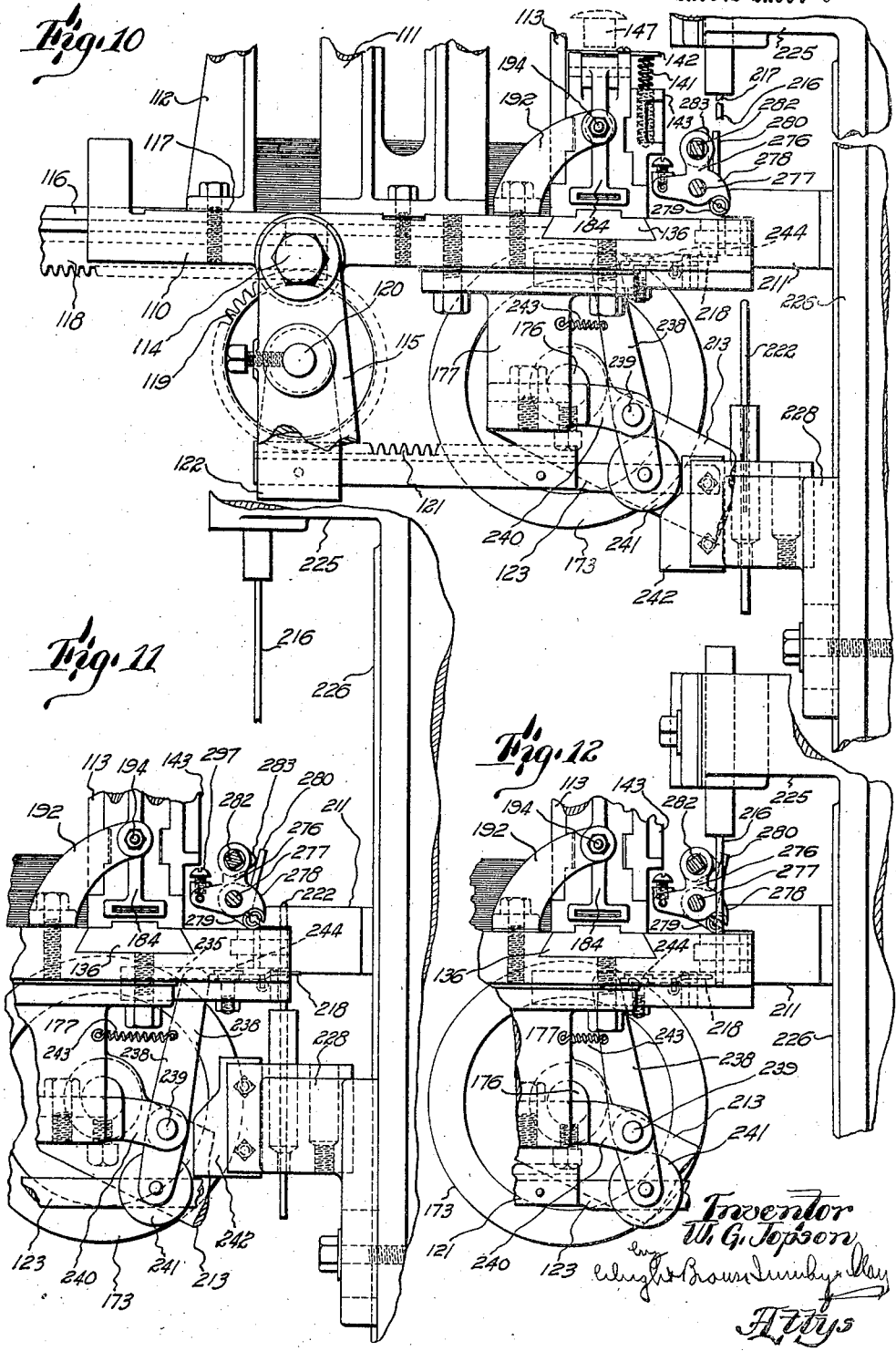

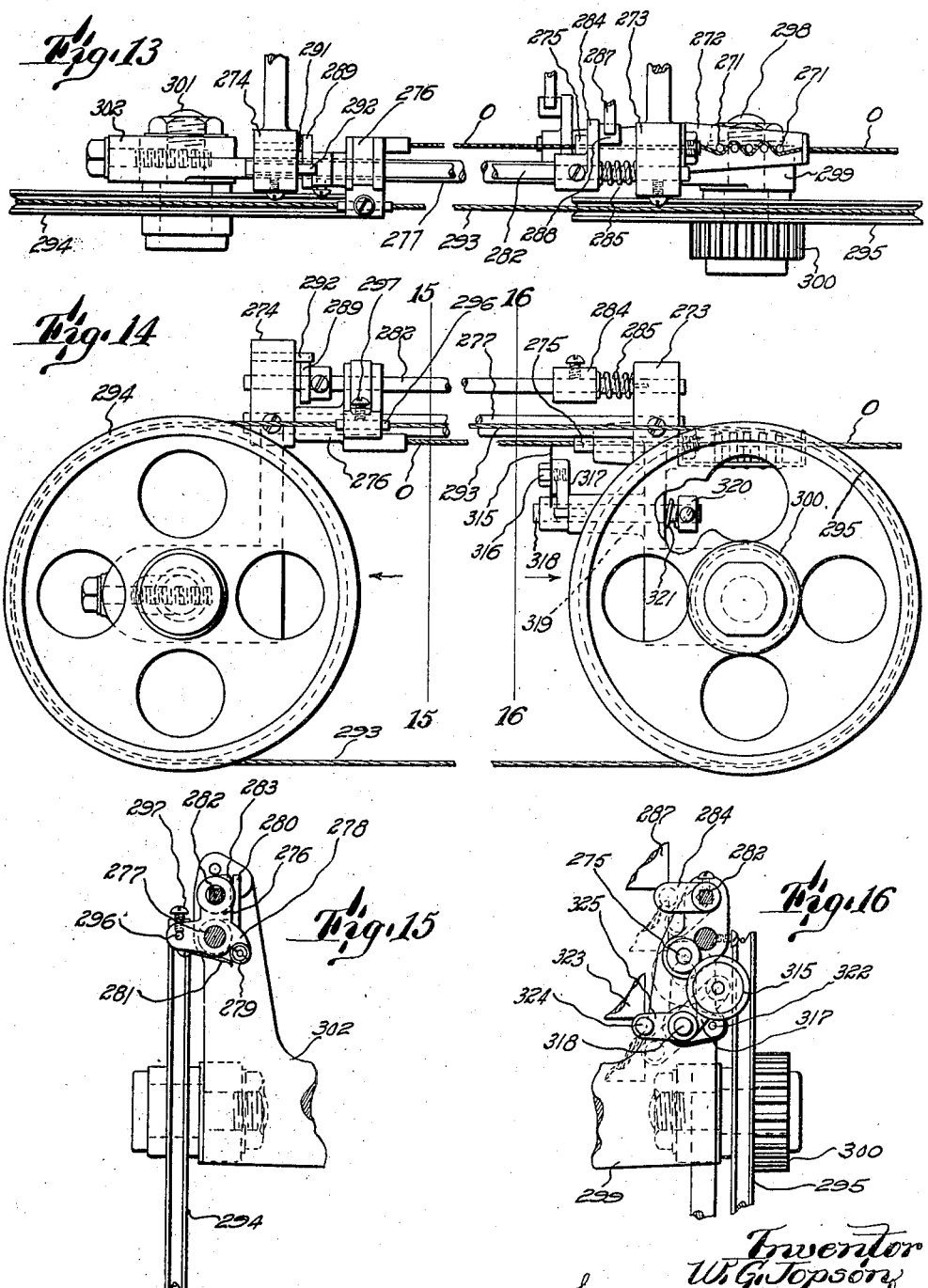

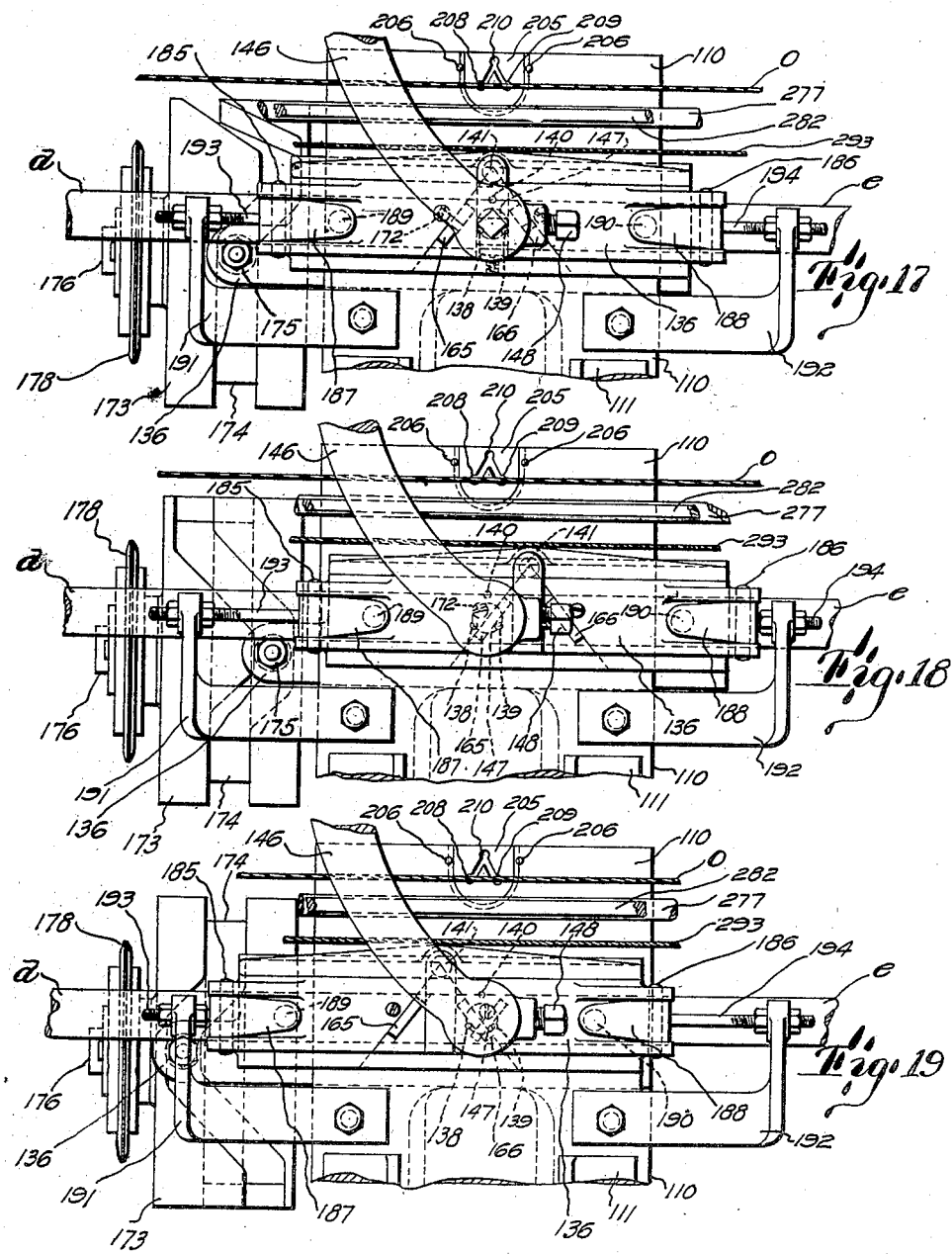

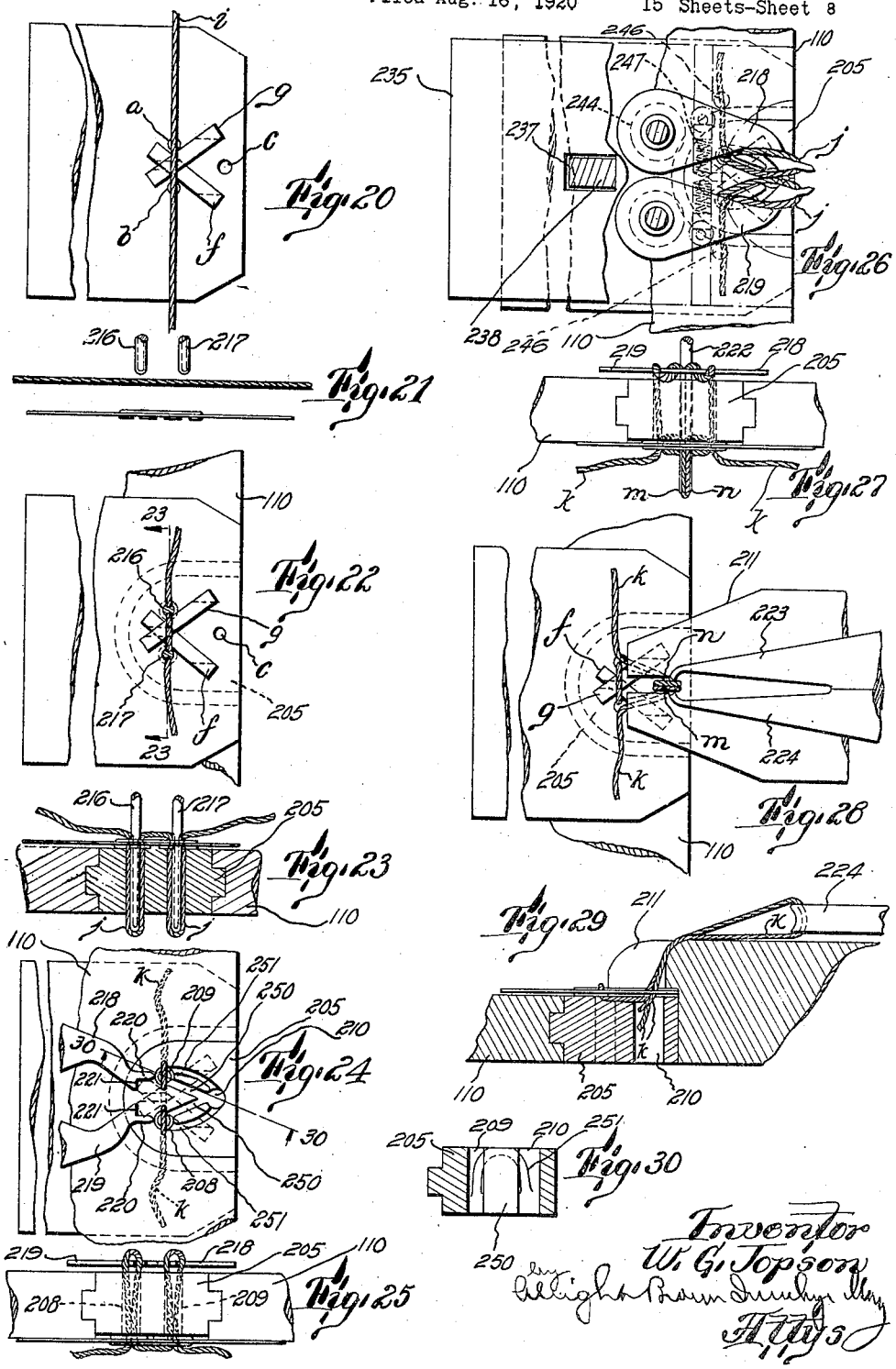

Dec. 30, 1924.
W. G. JOPSON
1,521,242
TAG STRINGING MACHINE
Filed Aug. 16, 1920    15 Sheets-Sheet 9
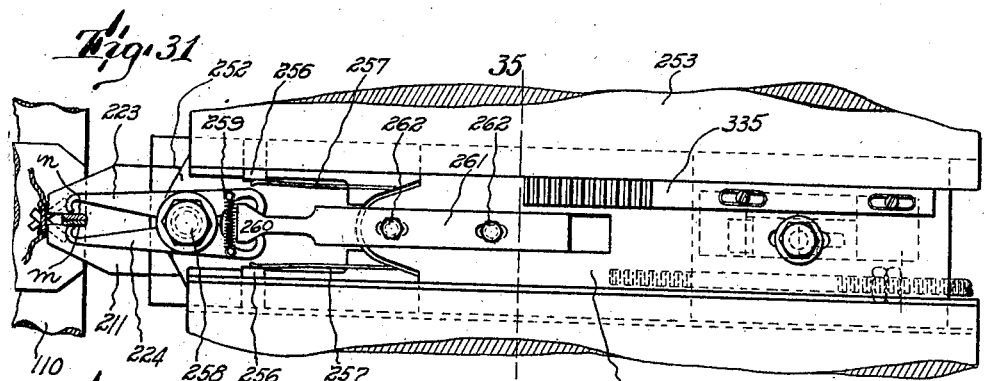
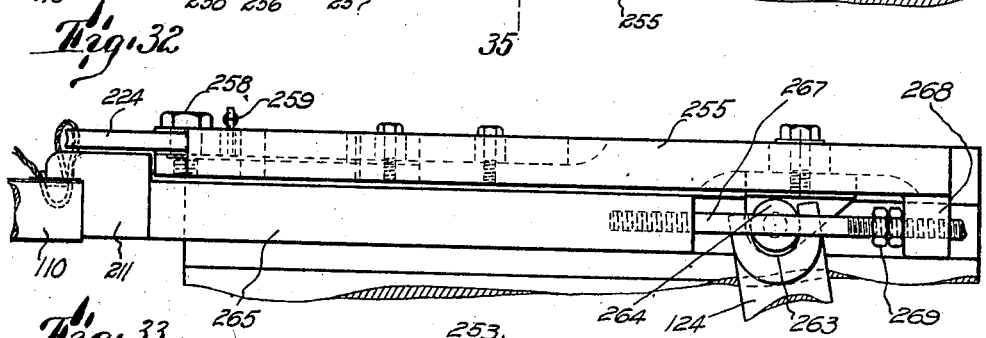
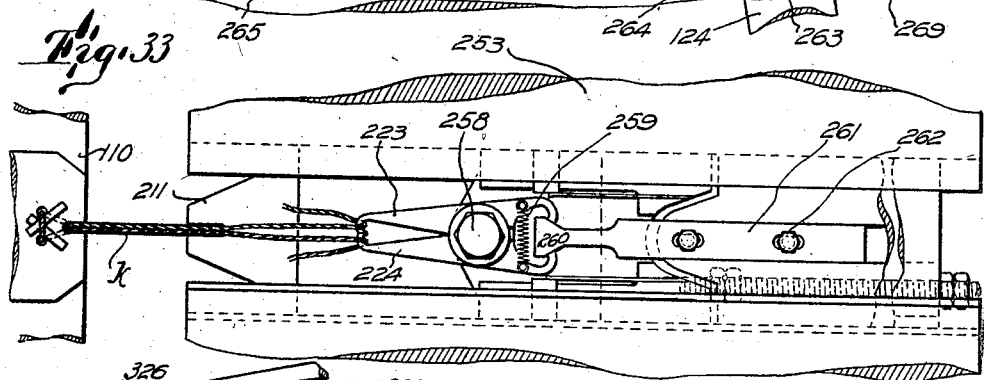
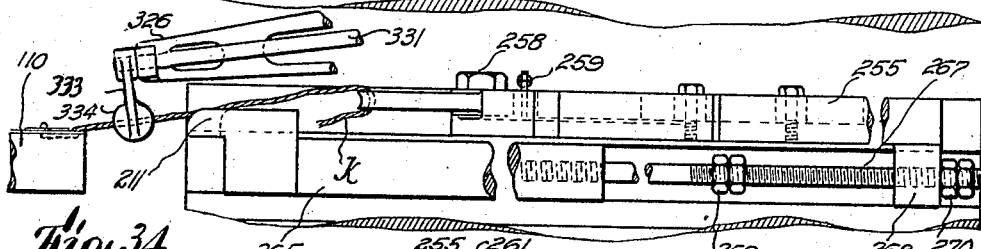
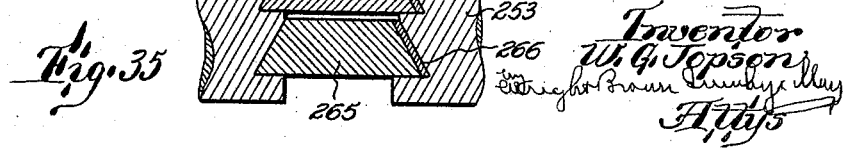

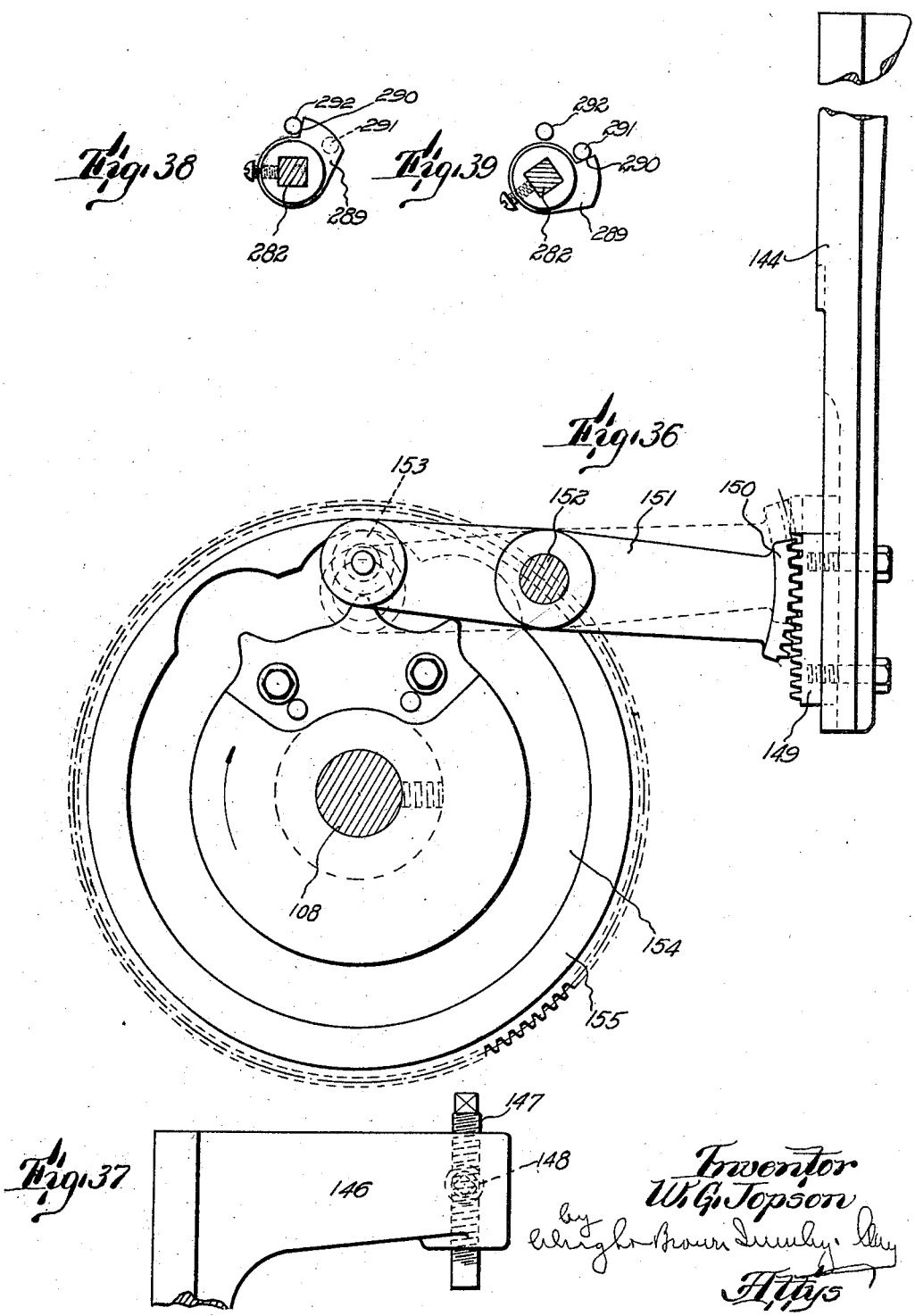

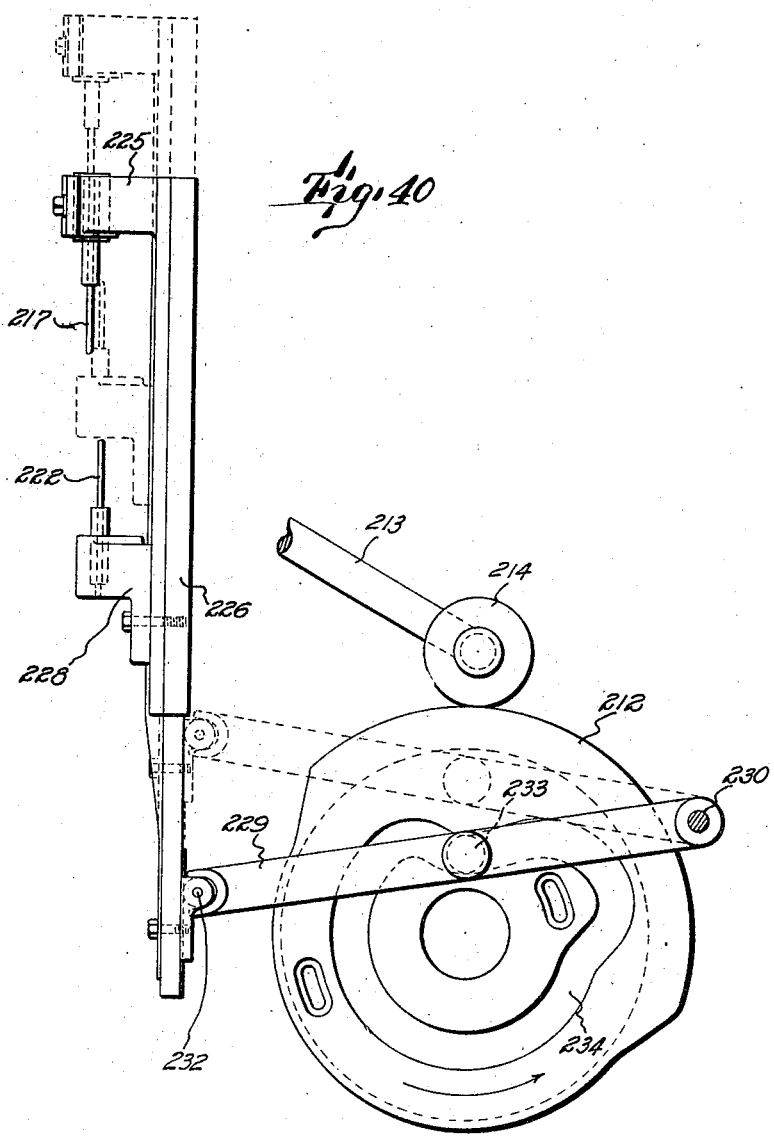

Dec. 30, 1924.
W. G. JOPSON
1,521,242
TAG STRINGING MACHINE
Filed Aug. 16, 1920     15 Sheets-Sheet 12
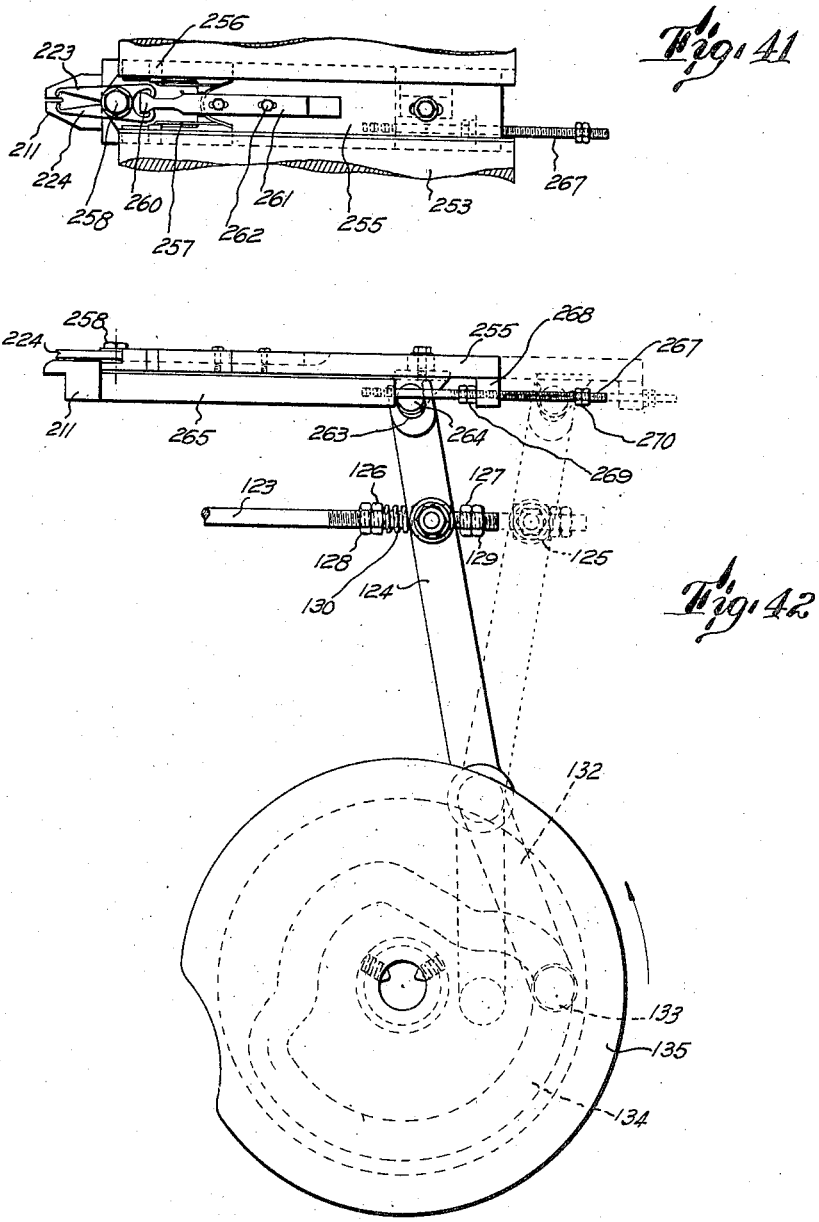

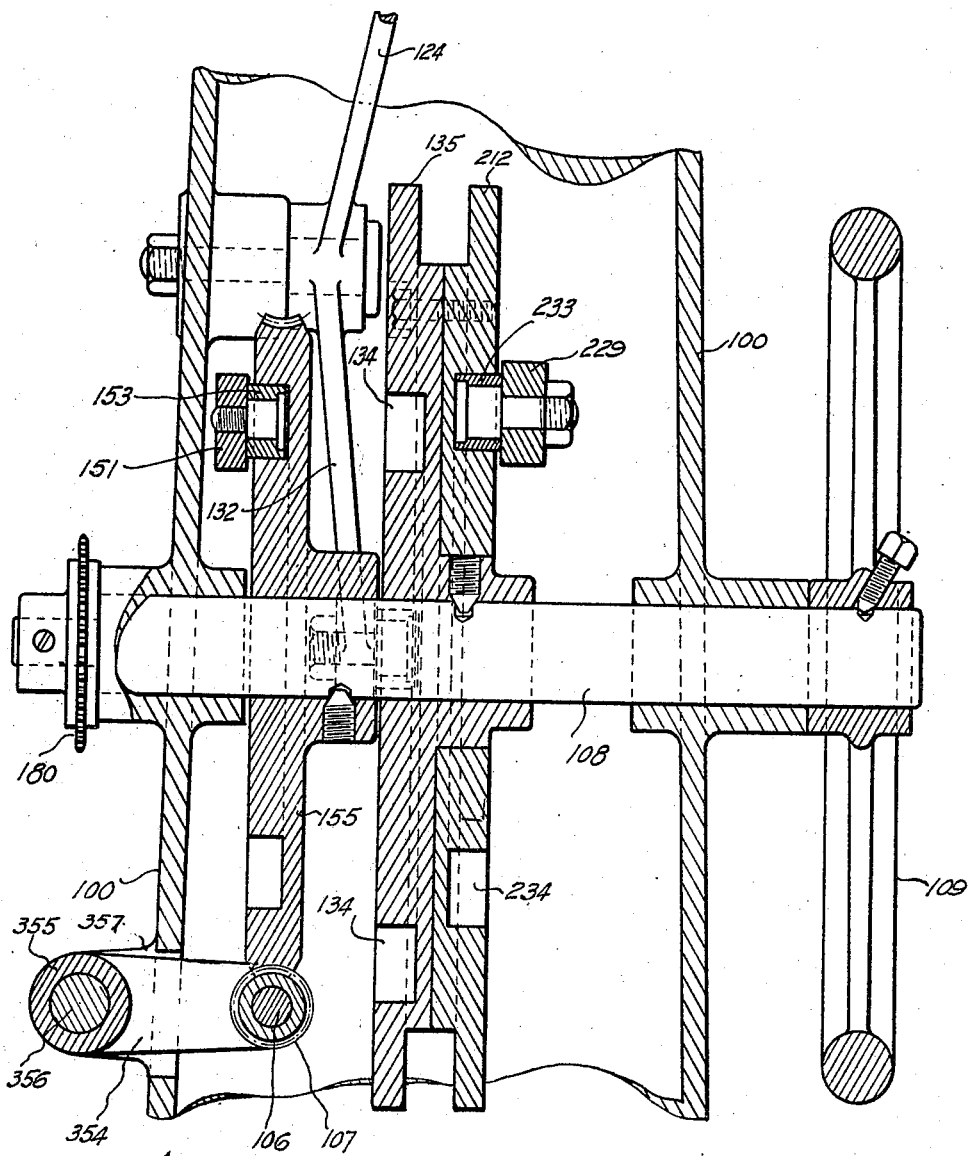

Dec. 30, 1924.
W. G. JOPSON
TAG STRINGING MACHINE
Filed Aug. 16, 1920   15 Sheets-Sheet 14
1,521,242
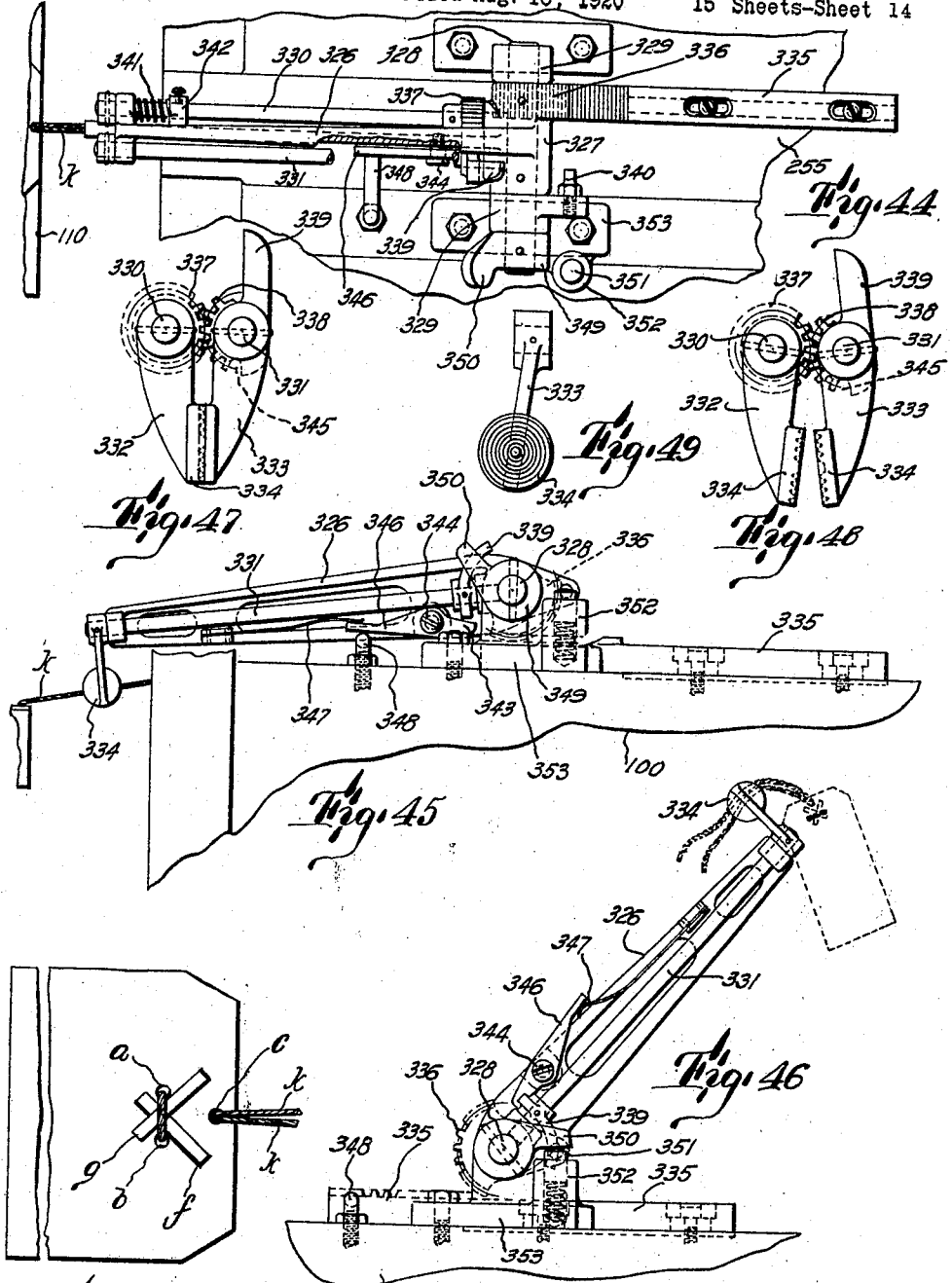

Dec. 30, 1924.

W. G. JOPSON 1,521,242

TAG STRINGING MACHINE

Filed Aug. 16, 1920   15 Sheets-Sheet 15

Inventor
W. G. Jopson
by Wright Brown ...
Attys

Patented Dec. 30, 1924.

1,521,242

UNITED STATES PATENT OFFICE.

WILLIAM G. JOPSON, OF WELLESLEY, MASSACHUSETTS, ASSIGNOR TO JOPSON MANUFACTURING COMPANY, OF BOSTON, MASSACHUSETTS, A CORPORATION OF MASSACHUSETTS.

TAG-STRINGING MACHINE.

Application filed August 16, 1920. Serial No. 403,920.

*To all whom it may concern:*

Be it known that I, WILLIAM G. JOPSON, a subject of the King of Great Britain, residing at Wellesley, in the county of Norfolk and State of Massachusetts, have invented new and useful Improvements in Tag-Stringing Machines, of which the following is a specification.

This invention has relation to machines for stringing tags; and its object, broadly speaking, is to produce a machine by which the strings may be automatically threaded into the tags.

The ordinary tag of commerce is usually provided at one end with a single aperture and with reinforcing annulæ encircling the aperture on both faces of the tag. So constructed, the commercial tags cannot easily be stacked, and one of the great difficulties that has been experienced in an attempt to produce a commercial tag-stringing machine has been due to the fact that the tags have been constructed as thus briefly described, making it practically impossible to secure an accurate feed of the tags automatically to the stringing mechanism.

Instead of employing the commercial tag with the annular reinforcement encircling a single aperture, I employ a tag having in the end thereof preferably three apertures which may be arranged at the apexes of a triangle, and I thread the string through these apertures so that the strings form the sides of the triangle and the free ends emerge in the same direction through an aperture located near the end edge of the tag. Consequently, the tags may consist of flat strips of thick paper and be arranged in a stack or pile to facilitate the feeding of the individual tags successively to the stringing mechanism.

In the particular machine in which the invention is illustrated as embodied I provide mechanism for automatically feeding the tags successively and mechanism for punching the apertures and in addition, mechanism for automatically threading the strings through the apertures of one tag before the next tag is punched. If the tag is formed of sufficiently tough stock, it needs no reinforcement, but, in order that the string may be prevented from tearing or cutting a tag made of relatively thin stock, I prefer to reinforce the tag in zones adjacent certain of the apertures, and, for this purpose, I prefer to use metallic staples. In such case, the machine is provided with mechanism for automatically feeding, cutting and inserting the staples in the proper places in the tags. Finding that excellent results may be secured by arranging the staples at an angle to each other so that one will cross the other, I preferably employ feeding and cutting mechanism for the strips from which the staples are formed, so constructed and arranged that, when the staples are inserted, they will be crossed as described. The machine is further provided with mechanism for automatically removing each tag from the machine after it has been punched, stapled and strung, and depositing it at some convenient point.

The machine as a whole has the instrumentalities thus briefly referred to so constructed, arranged and correlated in their movements that, from a stack of tags placed in the front end of the machine, the tags are successively and individually fed, punched, stapled, strung and removed from the machine, all automatically and without the intervention of human agency.

On the accompanying drawings, which, as previously indicated, illustrate but one embodiment of the invention, to the details of which the present invention is not limited,—

Figure 2 represents a side elevation of the same.

Figure 3 represents a plan view of the machine.

Figure 4 represents, partially in section, the mechanism for punching and stapling each tag.

Figure 5 illustrates the tag after it has been punched.

Figure 6 illustrates the same parts as illustrated in Figure 4, but shows them in position to drive the first staple.

Figure 7 shows the tag after the first staple has been driven.

Figure 8 illustrates the same parts shown in Figures 4 and 6, but illustrates them in position to effect the driving of the second staple.

Figure 9 illustrates the tag with the two staples driven and clinched.

Figure 10 represents in side elevation the magazine in which the tags are stacked, the mechanism for feeding the tags, and also illustrates the end of the cross-slide which carries the punch and the staple-cutting and driving mechanism.

Figures 11 and 12 illustrate a part of the mechanism shown in Figure 10, but in somewhat different position. (These figures also illustrate a portion of the mechanism for gripping and feeding the string, and the devices for engaging the loops of string which are thrust through the tag by the downwardly-operated needles.)

Figure 13 shows in plan view the string-gripping and feeding mechanism.

Figure 14 shows the same in front elevation.

Figure 1:
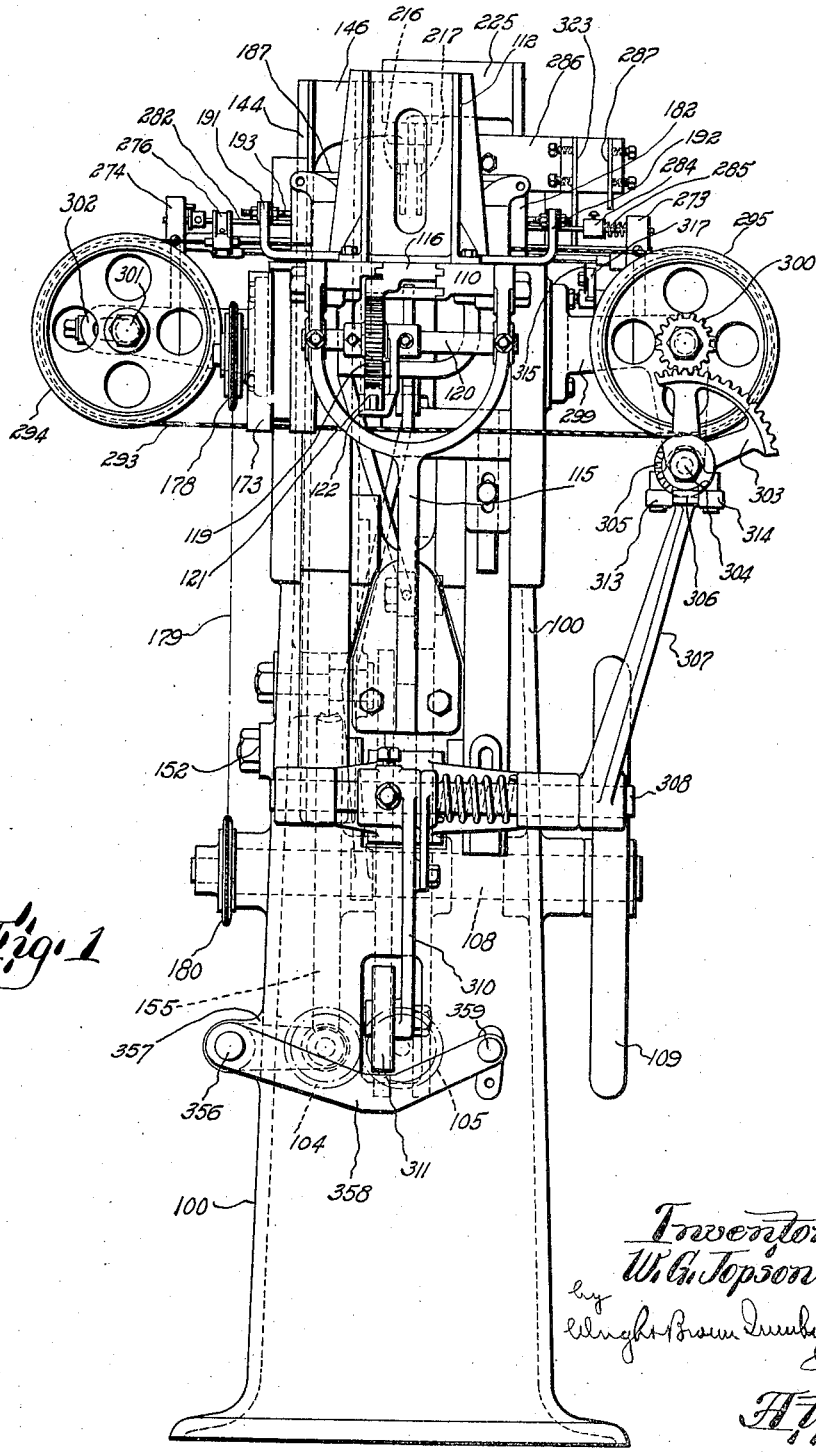
Figure 1 represents a front elevation of the machine.

Figures 15 and 16 respectively represent sections taken on the lines 15—15, 16—16 of Figure 14, looking in the direction of the arrows.

Figure 17 represents in plan view the mechanism for punching and stapling the tag with certain adjacent mechanism, and shows the parts in the position to effect the punching of the tag.

Figure 18 is a similar view of the same parts but shows the cross slide, which carries the punch and the staple-driving mechanism, in position to effect the driving of one of the staples.

Figure 19 is a similar view of the same parts but shows the cross-slide in the position for the driving of the second staple.

Figure 20 represents a plan view of a tag and shows the string arranged across the tag in position to have loops thereof thrust through two of the apertures in the tag.

Figure 21 represents an end elevation of the same and shows the needles in position to engage the string.

Figure 22 is another view of the tag showing the needles in cross section and illustrating the loops of string as being thrust through two of the apertures in the tag.

Figure 23 represents a section on the line 23—23 of Figure 22, and shows the needles and the loops having been passed through the tag.

Figure 24 is a view looking upwardly to the bottom side of the die and shows the two fingers which engage the loops of string for drawing the free ends of the string entirely through the tag.

Figure 25 represents an end elevation of the same parts (it being remembered that these parts are up-side-down).

Figure 26 is likewise a view looking from beneath upwardly to the die, and shows the fingers in the act of drawing the free ends of the thread through the loop and of holding two bights of the loops in position to be engaged by a third needle for carrying the ends of the string upwardly through the third aperture in the tag.

Figure 27 represents an end elevation of the same (it being remembered that this view shows the parts up-side-down).

Figure 28 illustrates a plan view of the tag with the presser-foot for engaging it and holding it in place during the stringing operation, and also illustrates the members for drawing the free ends of the string through the third aperture in the tag.

Figure 29 shows the same parts partially in section.

Figure 30 represents a section through what I term the die, on the line 30—30 of Figure 24.

Figures 31 to 35 inclusive illustrate the presser-foot and the fingers or members which draw the free ends of the string through the third aperture in the tag,—Figures 31 and 33 showing the parts in plan view but in different positions, Figures 32 and 34 showing the parts in side elevation and in different positions, and Figure 35 showing a section on the line 35—35 of Figure 31.

Figure 36 illustrates the mechanism for operating the driving ram by which the punch and the staple sets are operated.

Figure 37 represents the upper end of the ram.

Figures 38 and 39 are detailed views showing a part of the mechanism used in feeding and gripping the string.

Figure 40 represents the mechanism for operating the needles and the carrier therefor.

Figure 41 is another plan view of the presser-foot and of the fingers for drawing the free ends of the string through the third hole of the tag.

Figure 42 shows the mechanism from which the tag feed is operated and from which the mechanism shown in Figure 41 is also operated.

Figure 43 represents a vertical section taken through the cam shaft of the machine.

Figures 44 to 49 inclusive illustrate the mechanism for automatically removing the tag from the machine,—Figure 44 representing the same in plan view, Figure 45 representing the same in side elevation with the grippers in position to grip the free ends of the string, Figure 46 representing a side elevation with the tag in the position to be dropped, and Figures 47, 48 and 49 representing the grippers.

Figure 50 shows a plan view of the tag after the operations thereon have been completed.

Figure 51:
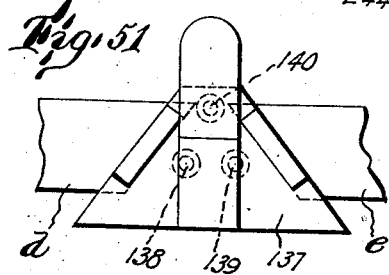

Figure 51 is a detailed view showing the punch head and sets and the metallic strips from which the staples are punched.

Figure 52:
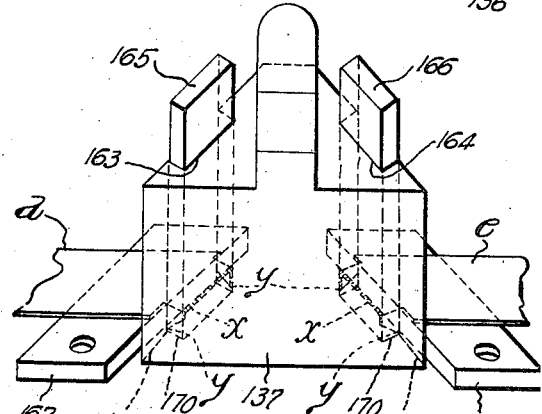

Figure 52 is an isometric perspective of the punch head, the sets, the stationary dies or shear blocks, and the metallic strips.

Figure 53:
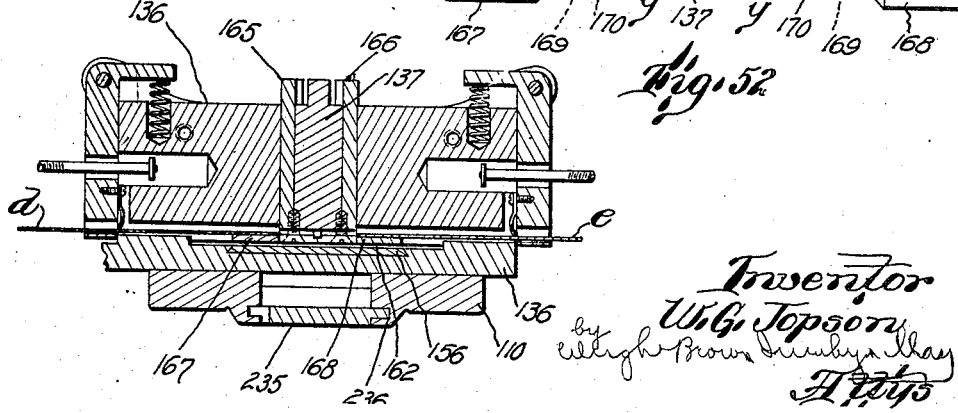

Figure 53 represents a longitudinal section through the laterally movable slide or carrier.

Figure 54:
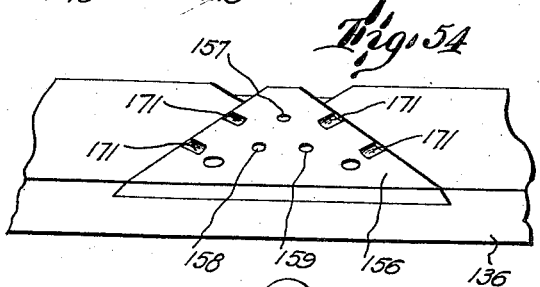

Figure 54 represents an isometric perspective view of the die block which cooperates with the punches and the sets.

Figure 55:
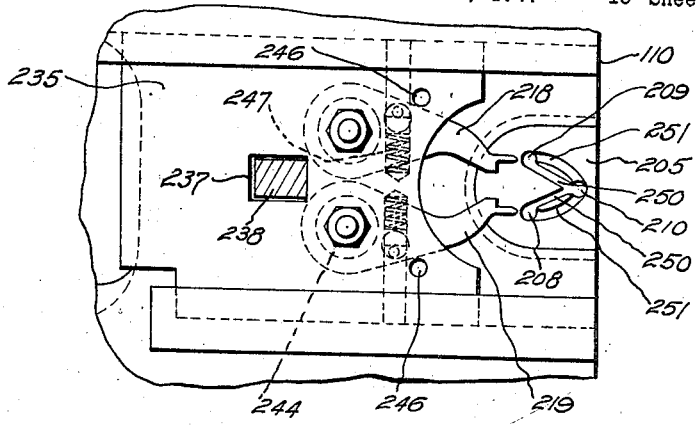

Figure 55 is a detailed view showing the fingers which carry the loops of string forwardly so that they may be strung through the third aperture in the tag. This view shows the parts looking from beneath.

Before proceeding to describe in detail the machine which is illustrated upon the drawings, I desire to reiterate that the machine represents but one embodiment of the invention which is capable of a variety of embodiments; that the parts, especially the cams, are shown more or less conventionally; and that the phraseology which I employ is for the purpose of description and not of limitation.

The machine is illustrated as being provided with a tubular bed or standard 100 which may be of any suitable form and dimensions to support the elements in proper relation. It is provided with a bracket 101 on which is mounted a motor 102 by which power is generated to effect the operation of the various operating instrumentalities to be described. While each machine is preferably provided with its own motor, it will be recognized that the machine may be driven, if desired, from a countershaft. As shown in Figures 2 and 3, the rotor shaft 103 of the motor is provided with a pinion 104 intermeshing with and driving a gear 105 on what I term the worm shaft 106 which extends longitudinally of the machine. This shaft carries a worm 107 intermeshing with and driving the worm wheel 155 on a transversely arranged cam shaft 108. On one projecting end of the shaft, there is located a hand wheel 109, which also serves as a momentum wheel to effect a steady rotation of the cam shaft 108. It is from the shaft 108 that all of the parts which require it receive power, and upon said shaft are mounted most all of the rotary cams which are utilized in the machine.

As I have previously stated, the tag blanks are stacked in a vertical pile, and for this purpose I employ a magazine or hopper for holding them in position. This magazine comprises a flat table 110 provided with upright side walls 111, a front end wall 112, and a rear end wall 113. The side and front end walls are secured to the table in such manner that they are adjustable to form a vertical guideway or magazine for tags of the desired dimensions. The rear end wall 113 is not secured directly to the table but is secured to a cross-slide, to be described, which carries upon it the punch plunger and the staple sets and cutters. For a purpose which will be subsequently described, the table 110 is not rigidly mounted. On the contrary, it is secured by trunnions 114 in the yoke-shaped end of a bracket 115 which is secured to the front side of the standard or bed 100, as best shown in Figures 1, 2 and 10. The table has a slight tilting movement at intervals about the axis of its trunnions, as will be subsequently explained in detail. Arranged in a guideway in the table so as to move longitudinally thereof, there is a feed slide which is indicated at 116 and which is utilized to feed the bottom blanks of the pile successively to the instrumentalities which operate thereon. This feed slide has a shoulder 117 for engaging the end of the bottom blank and thrusting it forwardly when the slide is operated. The under side of the slide is provided with a rack 118 which is engaged by a pinion 119, journaled loosely on a shaft 120 which is secured at its ends in the yoked end of the bracket 115, as shown in Figure 1. A second rack 121 engages the pinion 119, and the end of this rack 121 rests in a guideway formed by a hooked arm 122 secured to and depending from the stud shaft 120. The said rack 121 is secured to the end of a rod 123 which extends rearwardly, as shown in Figure 2, and is operatively engaged with a two-armed lever, the upwardly projecting arm of which is indicated at 124, as best shown in Figures 2 and 42. The end of the rod 123 is threaded and it passes loosely through a block 125 which is pivotally secured to the arm 124. Abutment nuts 126, 127, are placed on the threaded end of the rod 123 so as to allow the rod to have a limited free movement in reference to the block 125 and the lever 124 for a purpose to be described. Lock nuts 128, 129, are utilized to secure the abutment nuts or stops in place. A spring 130 is located between the stop or nut 126 and the plug 125 in order that the feed lever 124 may continue to move to a limited extent after the feed slide has reached the end of its movement. It will be understood, of course, that each tag must be fed to an approximately exact position in reference to the head or plunger which carries the punches by which the three holes are formed in the tag blank, and also to the stringing mechanism and consequently I place a stop or abutment in the path of the feed slide to stop the slide and the tag when they have reached final proper position, and it is for this reason that I locate the spring 130 between the rack rod 123 and the cam-operated lever 124. In Figure 3, the abutment or stop for the feed slide is indicated at 131. The forward movement of the feed slide is divided into two parts. That is to say, the slide is moved forwardly far enough to bring the tag in proper relation to the punching and stapling mechanisms, the slide remaining stationary during the operations thereof, and then the slide is moved to the end of its forward stroke where it remains during the time that the string is threaded through the apertures in the tag. It is not until the slide has reached the last-mentioned position that it engages the abutment 131. The lever 124 is cam-operated, its depending arm 132 being provided with a roller 133, which enters a cam groove 134 in a cam 135 mounted on the cam shaft 108. In Figure 42, the approximate shape of the cam groove 134 is shown; and, as is there indicated, the feed slide remains in its forward position during approximately one-third of a complete rotation of the cam shaft, whereupon it is withdrawn to its fullest extent, then fed forwardly partway where it remains a short time, and is then again fed forward to its fullest extent.

I shall now describe the mechanism for punching the three apertures in the tag blank, which I have indicated in Figure 5 as at $a$, $b$ and $c$. A punch head or plunger is utilized, and is provided with three punches to cooperate with a suitably formed die, and this punch head, for a purpose subsequently to be explained, is mounted in a cross-slide in which are likewise mounted the staple sets. Referring to Figures 4 to 6, and 10, the cross-slide is indicated as a whole at 136, and it is mounted to move in a transverse dove-tailed groove or guideway in the table 110. The punch head or plunger is shown in Figure 4 at 137, and it carries the three punches 138, 139 and 140 for punching the three holes $a$, $b$ and $c$ in the tag blank in such position that the holes $a$ and $b$ are in a line parallel to the end of the blank, and the hole $c$ is close to the edge of the blank, so that the three holes are located at the angles of a triangle, with the apex of the triangle close to the end edge of the tag. The punch head 137 is preferably triangular in cross section for a purpose to be described, and it is normally held in elevated position by a spring 141 which is located between a lug 142 at the upper end of the punch head and a projection 143 formed on the slide 136, said projection being socketed to receive the lower end of the spring. In addition to carrying the punches, the punch head performs another important function; namely, it partially cuts and it points the ends of the staples which are to be driven into the tag. The punch head is forced downwardly by what I term a ram. This consists of an upright bar 144 mounted in a vertical guideway 145 (see Figure 3) formed in the front side of the main standard or column, and at its upper end it has an arm 146 which projects rearwardly and laterally so that it may terminate over the punch head. In the end of the arm 146, there is adjustably screwed a threaded plunger 147 which may be securely held by means of a set-screw 148. When the cross-slide is in its middle or intermediate position, the plunger 147 is alined with the punch head 137, so that, upon the depression of the ram, the punch will be forced downwardly to cause the punches to perforate the tag blank. The ram is operated by a power-transmitting mechanism between it and the cam shaft 108. This mechanism is shown in Figure 36. At the lower end of the ram 144, there is secured a rack 149 with which engages a rack segment 150 on the end of a two-armed lever 151 pivoted on a stud 152 extending into the interior of the main column, it being understood that the lever 151 is located in the interior of said main column or bed. The lever 151 is provided with a roll 153 which extends into a cam groove 154 formed in the face of the worm-wheel 155 with which the worm 107, previously referred to, engages. This worm wheel rotates in the direction of the arrow, and the cam groove 154 is so formed that the ram is reciprocated three times in fairly rapid succession during each complete rotation of the cam shaft. The first depression of the ram causes the actuation of the punch, and the next two reciprocations of the ram cause the operation of the staple sets which are yet to be described. In Figures 52 and 54, I have shown the punch head and its cooperating die. It will be observed that the punch head is approximately triangular and that the die 156 is shaped to cooperate therewith. The die has the apertures 157, 158 and 159 to receive the punches. The die is mounted on the cross slide 136 so as to travel laterally with it, and the punch head is guided in blocks 160, 161, also secured to the cross head, a guideway 162 being afforded between the blocks and the slide for the passage of the tag blank. The tag blank is fed into this guideway by the feeding mechanism previously described, and, when in proper position, the punch head is depressed to cause the punches thereof to cooperate with the apertures in the die plate and form the apertures $a$, $b$ and $c$ in the tag.

I have stated that I propose to reinforce the tag at points or zones near the apertures $a$ and $b$ by staples which are eventually crossed as shown in Figure 9. I will now describe the mechanism by which these staples are cut and formed from the strips of ductile metal. The metal strips, which are indicated at $d$ and $e$, are fed laterally into the machine, as best shown in Figures 4 to 8 inclusive. Deferring for the time being the mechanism by which these strips are fed, I will describe the means by which the staples are formed at the ends of the strips and are then severed and forced into the tags. The initial cutting and bending of the ends of the staples from the strips is accomplished by the punch head. The sides of the punch head, as shown in Figure 52, converge, and in the side faces are formed guideways 163, 164 to receive two sets 165, 166, the function of which is to sever the cross-bar of the staple from the strip and force the staple into the blank. On the cross-slide are secured two stationary cutting dies or blades 167, 168, with which the sets 165, 166 cooperate in severing the body of the staple from the strips $d$ and $e$. The punch head 137 is formed with cutting edges 169, 169 and 170, 170, which cooperate with the stationary blades 167, 168 to sever the strips $d$ and $e$ inwardly from their edges to form the toes or shanks $x$ of the staples. Inasmuch as the side faces of the punch head and the sets 165, 166 are arranged at an angle of approximately 45° to the median lines of the metallic strips, the ends of the strips are severed diagonally, and thus the sides or toes of each staple are each provided with a point $y$. When the punch head descends, the cutting edges 169, 170 thereof cooperate with the stationary blades 167, 168 to cut the sides or toes of the staple and to bend them downwardly at right angles to the cross-bar or body thereof, as shown in Figures 52 and 6. When the punch head descends, the sets remain stationary and the head moves relatively thereto. Thus, on the ends of the two strips $d$ and $e$, the staples are potentially formed, and they are thereafter separately completely severed from the strips and driven into the tag blank by the sets, which are operated in succession after the cross-slide on which this whole mechanism is mounted has been moved laterally into proper position. The die plate or die 156, see Figure 54, is provided with depressions 171 into which the toes of the staples are forced and which serve to curl and clinch the staples.

Each staple set is adapted to be operated by the ram which carries the plunger 147 previously described, and for this purpose the cross-slide must be adjusted or moved laterally in one direction or the other to bring the desired set under the plunger 147. The sets 165, 166 are normally held upwardly in inactive position by springs 172 (see Figure 4) which are located in sockets in the cross-slide and engage pins or projections 1172 on the said sets. Assuming that the punch head has been depressed to form the apertures $a$, $b$ and $c$ in the tag blank and to partially form the staples at the ends of the strips $d$ and $e$, the parts all being in the position shown in Figure 4 after this has been accomplished, the cross-slide is then moved to the right, as shown in Figure 6, by mechanism which I will subsequently describe, so as to bring the set 165 beneath the plunger 147 on the ram. The ram is now depressed, in the manner previously described, and a staple $f$ is driven into the tag, as shown in Figure 7, so as to lie at an angle to the end edge of the tag and immediately adjacent the aperture $b$. Then the cross-slide is moved to the left into the position shown in Figure 8 so as to bring the set 166 into alinement with the plunger 147, and a staple is cut from the strip $e$ and driven into the tag as indicated at $g$ in Figure 9. This staple $g$ crosses that at $f$ and is located adjacent the aperture $a$. The staples, as now clinched in the tag, serve as reinforcements to prevent the string from tearing or enlarging the apertures $a$ and $b$. After the set 166 has been operated, the cross-slide is moved to its central or intermediate position so that the punch head is again alined with the plunger 147 ready to form the apertures in the next tag which is presented. It will be understood that, as the cross-slide is moved laterally in one direction or the other, the tag blank remains laterally stationary, being held against lateral movement by the side walls of the magazine into which its rear end still extends.

The mechanism for moving the cross-slide laterally comprises a cam 173 having a peripheral cam groove 174, as shown in Figures 17 to 19 inclusive. The cross slide has a roll 175 which enters the cam groove 174, and the groove is so formed that, as the cam is rotated, the cross-slide will be moved back and forth and held in the several positions previously described. The cam 173 is mounted on a stud shaft 176 mounted in a bracket 177 depending from the table 110, as shown in Figure 10. A sprocket wheel 178 is secured to the hub of the cam, as shown in Figures 17 to 19 and also in Figure 1, and this sprocket is driven by a chain 179 from a sprocket wheel 180 located at the end of the shaft 108, which it will be recalled is the same shaft upon which the other cams hereinbefore described are mounted. I prefer to use the chain and sprocket mechanism for driving the cam inasmuch as a flexible connection is thereby secured between the cam shaft 108 and the cam 173, which permits the slight movement of the table previously referred to for a purpose subsequently to be described.

I will now describe the mechanism by which the metallic staple strips $d$ and $e$ are fed, and reference may be had to Figures 4 to 8 and 17 to 19. These staple strips extend through guideways 180 formed in the cross-slide in such position that the ends of the strips will be brought into proper relation to the punch head and the sets. As the cross-slide is moved to the right or the left, as the case may be, the tendency, of course, is to move the strips with it, and this is relied upon in the step-by-step feeding of the strips in reference to the punch head and the sets. At the ends of the cross slide, there are two dogs 181, 182, having at their lower ends narrow throats 183, 184, through which the strips pass into the guideways 180. These dogs are pivoted upon pins 185, 186, and have fingers 187, 188, against which springs 189, 190 bear, so as to yieldingly force the dogs flat against the ends of the cross-slide. On the table 110, there are located two brackets 191, 192 (see Figure 17), the ends of which are bent so as to confront the ends of the cross-slide, and in the ends of the brackets 191, 192 there are adjustable rods 193, 194 which extend through apertures 195, 196, in the dogs 181, 182 (as shown in Figure 4) and enter sockets formed in the ends of the cross-slide, these sockets being shown in dotted lines at 198. On the ends of the rods 193, 194, there are heads 199, 200, which are adapted to engage the inner faces of the dogs 181, 182, respectively. The purpose of these rods is to engage the dogs and to hold them temporarily against movement during portions of the movements of the cross-slide, and thereby hold the metallic strips $d$ and $e$ against movement, while the cross-slide is moving, so as to effect a feed of the strips in relation to the cross-slide. For this purpose, the two dogs are provided with spring grippers, 201, 202, which are located with their ends close to the throats 183, 184, so as to grip the strips $d$ and $e$ to the dogs. Assuming that the parts are in the position shown in Figure 4, which they assume after the punch head has been depressed and the points or toes of the potential staples on the ends of the strips $d$ and $e$ have been formed and bent downwardly, the cross-slide is moved to the right so as to bring the set 165 in line with the plunger 147, as previously described. During this movement, both strips $d$ and $e$ are moved to the right, and the ram descends driving the staple $f$ into the tag as previously described, but, during this latter movement of the cross-slide, the dog 181 is engaged by the head 199 on the rod 193 and the dog is moved into the position shown in Figure 6, the gripper 201 sliding over the face of the strip $d$. When the cross-slide is moved from the position in Figure 6 to the left to assume the position in Figure 8, the spring 189 tends to move the dog 181 back to its original position, but this movement of the dog is also positively effected since the dog comes into contact with a nut 203 on the rod 193; and thus, since the gripper 201 engages the strip $d$, the strip is fed relatively to the cross-slide so as to advance it the width of a single staple. During this movement, however, the dog 182 is swung outwardly by the engagement of the head 200 on the rod 194, thereby permitting the gripper 202 to slide over the strip $e$. The strip cannot move itself because the points or toes on the potential or partially formed staple are bent downwardly past the stationary cutting die 168. After the second staple $g$ has been driven and the cross-slide is returned to the position shown in Figure 4, the strip $e$ is advanced one step in the same manner as the strip $d$ was advanced. From this description, it is apparent that, as the cross-slide is moved back and forth to position the punch head and the sets in registration with the plunger on the ram, the strips are automatically fed, so that, after each staple is driven into the tag, the strip from which it was formed is fed the proper distance for the formation of the next staple.

After the second staple has been driven into the tag, the preliminary operations on the tag are completed, and the tag is then ready to be moved into its final position for the stringing operation. The feed slide is now operated to feed the tag to its final position in reference to the table, where it is held firmly while the needles carry the string through the holes or apertures in the tag. As shown in Figure 17, for example, there is located at the end of the table 110 a throat plate 205. This throat plate is rounded and is inserted in a socket formed in the end of the table, and is held in place by screws or other fastenings 206. It is formed with three apertures 208, 209, 210, corresponding to the three punches and to the three holes $a$, $b$, and $c$ in the tag. The tag is fed forwardly until the apertures therein register with the apertures in the throat plate, and it is clamped in this position by a presser-foot which cooperates with or presses against the upper face of the table and clamps the tag against the face of the table. As shown in Figures 10 and 32, this presser-foot is indicated at 211 and it is adapted to overlap the end of the table and the end of the tag thereon. The presser-foot has a longitudinal movement only, and it may be moved into the position to overlap the table as shown in Figure 32, or to be retracted therefrom as shown in Figure 34. It is for this reason that the table is mounted so that it may tilt about the trunnions 114; and, after the presser-foot has been moved towards the end of the table, the end of the table is swung upwardly so as to clamp the tag thereagainst. This tilting movement of the table is accomplished by a cam 212 (see Figure 2) on the cam shaft 108. An arm 213, extending from the bracket 177 (see Figure 10) which is secured to the under side of the table, carries on its end a roller 214 (see Figure 2) which engages the cam 212. The cam has a depression 215 which permits the end of the table to drop during part of the rotation of the cam shaft 108, the table being thereafter elevated so that its end clamps the tag against the under face of the presser-foot. I shall not now explain the mechanism by which the presser-foot is longitudinally reciprocated, reserving such description to a latter part of the specification, as the mechanism utilized is also employed in connection with another part of the machine.

In stringing each tag, a length of string from a suitable source of supply is drawn laterally across the tag and directly above the two holes $a$ and $b$ therein. Then two needles, which register with the apertures or holes, descend and force loops of the string downwardly through the said apertures. These two needles are then carried upwardly out of the apertures, and the free ends of the strings are drawn downwardly through the said apertures and are brought together underneath the tag so as to lie under the aperture $c$ in the tag. Another needle, which registers with the aperture $c$ and is located below the tag, now rises, and engaging the strings carries the free ends thereof upwardly through the aperture $c$. Hooks are then used to draw the free ends of the strings outwardly through the last-mentioned aperture, and this completes the stringing of the tag. In Figures 20 to 29 inclusive, I have illustrated the manner in which the tag is strung. Omitting for the moment how the string is fed and laid across the tag, it will be seen, from an examination of Figure 20, that the string, which is indicated as a whole at $i$, lies across the tag and registers with the apertures $a$ and $b$ thereof. Two needles, which are indicated at 216, 217, descend and force the string through the apertures to form loops $j$ $j$, as shown in Figure 23. These needles descend through the proper apertures 208, 209 in the throat plate 205. The lower end of each needle is rounded and the opposite sides and the end of each needle are grooved so that the string will lie partially in the grooves. After the loops $j$ $j$ have been forced through the apertures $a$ and $b$, the needles now ascend, leaving the loops behind them. On the under side of the table, there are two fingers 218, 219, the function of which is to engage the loops and partially draw the free ends $k$ $k$ of the string through the two apertures of the tag. These two fingers have points 220 and shoulders or abutments 221 which form reentrant angles or corners on ensuring the engagement of the fingers with bights of the loops. In Figure 24, which shows the table and the throat plate up-side-down, the fingers are in position to engage the loops. These fingers then move to the right, as shown in Figure 26, and bring the inner bights of the loops $j$ $j$ into contiguous relation immediately below the third aperture $c$ and the aperture 210 of the throat plate. Thereupon a third needle 222, which is grooved and which has a rounded end, moving upwardly engaging the two bights of the loops, carries the loops upwardly through the apertures last referred to and forms two loops extending upwardly, these two loops being, to distinguish them, indicated as $m$ $n$. In Figures 27 and 28, the parts are shown up-side-down and the needle 222 appears to be moving downwardly, whereas, in actual fact, it moves upwardly so that the loops $m$ and $n$ will be above the tag, as shown in Figure 28. Then two hooks 223, 224 engage the loops $m$, $n$, and, moving to the right from the position shown in Figure 28 to that shown in Figure 29, draw the free ends $k$ $k$ of the string through the aperture $c$ in the tag, so that the completed tag presents the appearance shown in Figure 50 with both free ends of the string emerging in the same direction through the aperture in the tag which is nearest the end thereof.

Returning to the two needles which I first referred to and which are numbered 216, 217, they are secured to an arm or head 225 formed on the upper end of a ram 226 (see Figures 1, 2 and 10). This ram slides in a guideway 227 affixed to the main column 100. The third needle 222 is mounted in a bracket 228 secured to the ram or slide 226. All three of these needles are preferably adjustable lengthwise, any suitable means being provided for securing the needles 216, 217 and 222 to the parts on which they are mounted. The ram or slide 226 is operated by a cam located on the main cam shaft 108. To this end, a lever 229, extending horizontally through the body of the main column, is pivoted at one end upon a stud 230 journaled in a bracket 231 secured to the rear side of the main column, as shown in Figure 2. The other end of this lever 229 is pivotally connected to the ram or slide 226 by a pivot pin 232. The lever 229 is provided with a truck or roll 233 which extends into a cam groove 234 formed in the face of the cam 212 (see Figure 43). These parts are also shown in Figure 40. The cam groove 234 is so formed as to impart to the ram or slide 226 the movements necessary to cause the needles to perform the functions at the proper times as hereinbefore described. In general, it may be said that, during the first half of one rotation of the cam shaft 108, a tag is fed, is punched and has the staples inserted therein, while the stringing of the tag is accomplished during the remainder of the rotation of the shaft. The fingers, which engage the loops which are first thrust through the apertures $a$ and $b$ of the tag (which fingers it will be remembered are indicated at 218 and 219), are mounted in a slide placed in a guideway in the under side of the table 110, these parts being best shown in Figures 10 to 12 inclusive, taken in connection with Figure 4 for example. The finger-carrying slide is indicated at 235 in Figure 4, and the guide way therefor is indicated at 236. The slide is slotted as at 237 to receive the end of a lever 238 (see Figures 10 to 12) which is pivoted on a stud 239 mounted in a lug 240 secured to the bracket 177 previously referred to. The lever 238 has a depending arm provided with a roll 241 arranged in the path of a cam member 242 secured to the bracket 228 which carries the needle 222. A spring 243 holds the roll 241 against the cam 242. As the needle ram is elevated and depressed, the finger-carrying slide 235 is reciprocated to perform the functions previously ascribed to it. The two fingers 218, 219 are themselves pivoted in the slide 235 and are provided with studs 244 extending into sockets in the slide 235. The free ends of the fingers are normally pressed outwardly against stops 246 by springs 247. These springs tend to slightly separate the ends of the fingers. The fingers are thus pivotally mounted so that they may yield laterally to a certain extent towards and from each other under the stress of the string as they are moving the loops $j$ $j$ into position to be engaged by the needle 222. It is essential that the adjacent bights of the two loops $j$ $j$ should be accurately located in respect of the aperture 210 in the throat plate, and for this reason, the under side of the throat plate is provided with slots 250, 250, which connect the aperture 210 with the apertures 208 and 209, and also with grooves 251 which are arcuate as shown in Figure 24 so as to receive the outer bights of the loops.

The hooks 223, 224, which engage the second pair of loops $m$ $n$ which project through the aperture $c$ of the tag, are best shown in Figures 31 to 35 and Figures 41 and 42. These hooks are mounted upon a slide 252 arranged in the top of the main column, as shown in Figure 3. The upper end 253 of the column is flat, and it is provided with a guideway 254 in which is mounted the slide 252 and a second slide 255 so that at times the ends of the two slides may abut. The slide 252 fits friction-tight in the guideway, friction blocks 256 and springs 257 engaging the blocks being employed to increase the frictional resistance to the movement of the slide 252. The two hooks 223, 224 are pivoted upon a stud 258 on the slide 252, much as the blades of a pair of shears are pivoted together. A spring 259, connected to the rear ends of the hooks, tends to draw the rear ends together. The rear ends of the hooks are curved inwardly so as to engage a wedge 260 formed on the end of a bar 261 adjustably secured to the slide 255 by means of screws 262. The slide 255 is reciprocated by the same lever 124 which is utilized in actuating the feed slide for the tag blanks, as shown in Figure 42. The said lever 124 has a yoke-shaped end 263 which embraces a stud 264 secured to the under side of the slide 255. As the cam 135 is rotated to effect the oscillation of the lever 124, the slide 255 is reciprocated as will be readily understood. When the slide 255 moves from the position shown in Figure 33, to the position shown in Figure 31, it traverses a short distance before its end engages the confronting end of the slide 252, and consequently the wedge 260 moves relatively to the hooks so as to allow their ends to separate. Then, when the end of the slide 255 abuts the end of slide 252, the two slides move together until the hooks 223, 224 are in a position where they may engage the loops $m$ $n$ of the string, as shown in Figure 28.

When the slide 255 moves rearwardly, the slide 252 remains stationary until the wedge 260 has operated on the rear ends of the hooks and closed the hooks together so as to engage the loops $m$ $n$ of the string. Thereafter the continued movement of the slide 255 causes the slide 252 to move with it. In moving from the position shown in Figure 31 to the position shown in Figure 33, the hooks 223, 224 draw the free ends $k$ $k$ of the strings through the third aperture $c$ in the tag.

The movement of the hook-operating slide effects the movement of the presser-foot 211, to which reference has been previously made, so that the mechanism for operating the presser-foot may now be described. This presser-foot is formed on the end of a slide 265 which is mounted to move in a guideway 266 in the top 253 of the column. It is immediately below the slide 255, as shown in Figure 35, but it is shorter than the slide 255, as shown in Figure 42. A threaded rod 267 projects from the end of the slide 265 and passes loosely through an aperture formed in a lug 268 depending from the end of the slide 255. Nuts 269, 270 are placed on the rod, on opposite sides of the lug 268, so that, as the slide 255 is reciprocated, it will, at the end of each movement in one direction or the other, move the presser-foot 211 with it, a short distance. The movements of the parts are so correlated that the presser-foot is advanced into position immediately prior to the final feeding of the tag into the position in which it is to be strung and immediately before the table is tilted into exact horizontal position, as a result of which the end of the tag will be gripped between the end of the table and the presser-foot. As soon as the stringing of the tag has been completed by the movement of the hooks from the position in Figure 31 to the position in Figure 33, the table may be tilted slightly, the presser-foot being now withdrawn.

It is now necessary to describe the mechanism by which the string is fed and located in relation to the apertures in the tag. I prefer to use a string which is somewhat stiff, such as the string which is ordinarily used in stringing tags. The ball or spool of string may be supported in any convenient place, and in Figure 13, to distinguish the body of the string from the end which is to be severed, I have indicated it at o. The string, of course, is fed laterally in reference to the tag and to the path of movement of the tag. Its end must be gripped and drawn across the tag, and the string which is measured out must be sufficient in length to form the necessary loops and provide the free attaching ends. After the necessary length of string has been fed, it is severed from the body thereof. The body portion of the string o, as shown in Figure 13, passes around pins 271 on a plate 272, which is affixed to a bracket arm 273 secured to the top of the main column 100. A similar bracket arm 274 is on the opposite side of the machine, as shown in Figure 3, these arms being utilized to support certain of the elements to be described. The function of the pins 271 is to furnish a resistance to the passage of the string and to prevent any movement or withdrawal thereof after the length of the string for the tag has been severed. From the pins 271, the string passes through a tubular guideway 275 on the arm 273, and, when the length of string is severed, the end of the body portion projects far enough beyond the inner end of the guide that it may be grasped by grippers which feed the string. These grippers are supported by a carriage 276 which is adapted to slide on a cylindrical guide rod 277, the ends of which are supported by the bracket arms 273, 274. The gripper comprises a relatively stationary jaw 278 and a movable jaw 279, the latter being pivoted to move about the axis of the guide 277 and having an arm 280 by which it may be actuated. A spring 281 serves to close the movable jaw 279. For the purpose of opening the jaw at the proper time, I utilize a mechanism which comprises a bar 282 parallel to that at 277, and having its ends mounted to rotate in the brackets 273, 274. A cam 283 is mounted on the rocker bar 282 so as to slide thereon with the gripper, and, by rocking the bar in a clockwise direction in Figure 15, the cam 283, engaging the finger or arm 280, opens the movable jaw 279. The movable jaw must be closed upon the short projecting end of the body portion of the string when the gripper is at its extreme position towards the tubular guideway 275 so as to grip the string and the gripper must remain closed until it has moved a sufficient distance to draw out a length of string sufficient for the tag; whereupon the gripper jaws must be opened to release the string. For this purpose, there is secured to the bar 282 the hub of an arm 284, and, between the said hub and the bracket 273, there is a coiled spring 285, one end of which is introduced into the bracket 273 and the other end is introduced into the hub. The needle ram 225 has attached to it a bracket 286 (see Figure 1) which carries an adjustable plunger or cam 287 located in such position that, when the needle ram or slide descends, the cam 287 will engage a stud 288 on the arm 284 and rock the rod 282 to open the gripper. The gripper must remain open, as this action occurs only after it has reached the end of its feeding movement, until the gripper has returned to its starting position and is ready to grip the end of the body of the string. For the purpose of holding the gripper open, I place on the rod 282 a dog 289 (shown in detail in Figures 38 and 39), having a shoulder 290 which may be engaged with either of two pins 291, 292, projecting inwardly from the bracket 274. One of these pins, i. e. that at 292, is longer than the other. The dog is secured rigidly to the bar 282, and the latter has a limited sliding movement in its bearings in the brackets 273, 274. Normally the shoulder 290 on the dog is engaged with the short pin 291, but, when the gripper is moved far enough to the right in Figure 14 so that it engages the hub of the arm 284, it moves the rod against the tension of the spring 285, whereupon the dog is permitted to slide off the end of the pin 291. The spring 285 thereupon rocks the bar 282 sufficiently until the dog engages the pin 292. As the rod 282 rocks, the cam 283 is moved away from the finger 280, and the spring 281 closes the movable gripper jaw against the stationary jaw. This action takes place, as stated, as the gripper jaw moves into the position where it may engage the end of the string. The gripper now engages the string, and is moved to the left, in Figure 14, by a mechanism to be explained, and draws out the string for the proper distance. The gripper must now release the string, and, for this purpose, the rod 282 must be rocked to cause the cam 283 to open the movable jaw of the gripper. This is accomplished by the engagement of the cam or plunger 287 with the lug 288 and the lever 284, as previously described; and, as the rod is thus rocked, the pressure of the spring 285 causes the dog 290 to be pressed behind the short pin 291, thereby locking the movable jaw in its open position.

For the purpose of moving the string gripper carriage back and forth on the guide rods 277 and 282, I employ a flexible steel-wire belt 293 which tracks about pulleys 294, 295. The gripper carriage, as shown in Figure 15, has a lug or projection 296 through which the wire belt 293 passes, and to which it is secured by a set screw 297. One of the pulleys, i. e. that at 295, is rotated first in one direction and then in the other to feed the gripper carriage back and forth. This pulley is journaled on a stud shaft 298 secured to a bracket 299 affixed to one side of the main column 100, and the pulley has secured thereto a pinion 300. The other pulley 294 is likewise journaled on a stud shaft 301 secured to a bracket 302 affixed to the other side of the main column 100. In order that the pinion 300 and the pulley 295 may be rotated first in one direction and then in the other, I employ a toothed segment 303 (see Figure 1) which is journaled on a stud shaft 304 supported upon a depending portion of the bracket 299. Formed on the hub of the segment 303 are spiral gear teeth 305 which may be engaged by complemental teeth on a segment 306 (see Figure 2). This latter segment is formed on the end of an arm 307 of a lever pivoted at 308 on a bracket 309. The other arm 310 of said lever extends into the interior of the column 100 and is provided with a roll 311 engaging the periphery of the cam 135, said cam having the depression indicated at 312. The segment 306 is guided in its oscillation by rolls 313, 314, journaled on the lower end of the depending arm of the bracket 299. Naturally, as the cam rotates, the segment-carrying lever is oscillated to oscillate the toothed segment 303 and cause the pulley 295 to be rotated, first anti-clockwise to draw out the string and then clockwise to carry the gripper back to its starting position.

After the necessary length of string has been drawn out by the gripper, and before the gripper releases the end of the drawn-out length, the string is cut at a point relatively close to the tubular guideway 275. To this end, I employ a very sharp disk cutter 315, which is secured by a screw 316 on an arm 317 secured to a shaft 318, as shown in Figures 14 and 16. The shaft 318 is mounted in a bearing 319 formed on the bracket arm 273, and, on its outwardly projecting end, there is secured to the shaft a collar 320. A spring 321, having one end inserted in the collar and the other end inserted in the bracket, tends to rotate the shaft 318 until the arm 317 engages the stop pin 322, as shown in Figure 16, with the disk-cutter in its inactive position. For the purpose of rocking the shaft in the other direction to cause the cutter to sever the string, I employ a plunger or cam 323 which is secured to the bracket 286 on the needle ram 225, see Figure 1. When the ram descends, the plunger or cam 323 engages a stud 324 on an arm 325 integral with the arm 317 which carries the cutter, and, rotating the shaft, swings the cutter into position to engage and sever the string. This action takes place after the pair of needles has descended far enough to engage the string preparatory to forming the loops through the holes or apertures a and b of the tag and after the gripper has completed its string-drawing movement.

From the discription thus given, it is apparent that the end of the body of the string is gripped by the gripper and is drawn across the tag in position for the upper needles to engage it, and, after such engagement takes place, the string is severed; whereupon the gripper moves back to its starting position and is closed upon the string ready to draw it out for the next succeeding tag. After the end of the string-drawing movement, the gripper dwells long enough for the string to be threaded through the holes of the tag, and the needles to be restored to their original positions before it moves back into position to engage the end of the body of the string to draw out a fresh length. There is no perceptible pause between the withdrawing movement of the gripper and the string-feeding movement of the gripper. When these functions have been completed, the tag has been punched, stapled and strung and is now ready to be removed from the machine.

The tag-removing mechanism, which is next to be described, is illustrated in detail in Figures 44 to 49 inclusive, which may be considered in connection with Figures 2 and 3, although in Figure 3 the tag-removing arm and its adjacent mechanism are omitted since their illustration would make the figure confusing. The mechanism includes or comprises an arm 326, the hub 327 of which is pinned to a rock-shaft 328 journaled in bearings 329 affixed to the top of the main column 100, this shaft straddling the presser-foot slide and the hook slide. Arranged on opposite sides of the arm 326 and journaled in bearings at the ends of the arm are two rock-shafts 330, 331, which at their outer ends are provided with jaws 332, 333, adapted to grip the strings of a strung tag, as shown in Figure 34, so that, when the arm 326 is rocked upwardly, the tag will be removed from the table on which it has been supported up to this time. The jaws are formed in any suitable manner and may be provided with serrated circular faces 334. The arm 326 is swung in the arc of a circle about the axis of its supporting shaft 328 by means of a rack 335 which is secured to the slide 255 previously described. The rack engages a pinion or gear segment 336 formed on or secured to the hub 327 of the arm 326. In order that the jaws may close upon the string of the tag as the arm swings downwardly, and may release the string after the tag has been withdrawn, the following mechanism may be used. On the shaft 330 is a pinion 337 engaging a gear segment 338 on the shaft 331, so that the two shafts, and consequently the gripping jaws, will be moved simultaneously in opposite directions. The gear segment 338 is formed with a finger 339 which is adapted to engage a stationary stud 340 supported by the bearing 329. This engagement takes place as the tag-removing arm 326 approaches the end of its upward movement, and, as a result thereof, the shaft 331 and the shaft 330 are rocked in opposite directions to open the jaws and release the tag. The jaws are closed together by a spring 341 which encircles the outer end of the shaft 330 and which has one end secured to a stationary bearing lug on the arm and the other end secured to a collar 342 attached to the shaft 330. Normally, as soon as the arm starts its downward movement and the finger 339 leaves the stud 340, the jaws would close, but, in order to prevent this, means must be provided for locking the jaws in their open position until the arm has swung downwardly far enough for the jaws to be able to grip the string. This locking mechanism comprises a latch 343 which is pivoted on a stud 344 screwed into the side of the arm 326. The end of the latch is adapted to enter a toothed space or notch 345 in the gear segment 338 (see Figure 47). The latch has a finger 346 which is engaged by a leaf spring 347 carried by the arm 326, the spring tending to move the latch into engagement with the socket or toothed space 345. Consequently, just as soon as the lever 339 leaves the stud 340, the latch engages the gear segment and prevents the jaws from closing. As the tag-removing arm 326 approaches the position shown in Figure 45 after leaving the position shown in Figure 46, the finger 346 of the latch engages a stationary stop 348 on the top of the column 100, and the continued movement of the arm 326 causes the latch to be withdrawn from its socket 345 so that the spring 341 on the shaft 330 will cause the jaws to close and engage the string of the tag, as shown in Figure 45. This completes the cycle of operations of the machine, for the tag is not actually removed by the upward swinging of the tag-removing arm until the hooks are advanced to engage the loops of the string in the next tag to be strung. In order to prevent shock to the arm 326 as it reaches the end of its tag-removing movement upwardly, there is pinned upon the shaft 328 a hub 349 having a projection 350 adapted to engage a spring-stressed pin 351 placed in a socket 352 formed in a bracket 353. The bracket 353 also is provided with one of the bearings 329 for the shaft 328.

Any suitable means for connecting the power with and disconnecting it from the operative mechanisms may be employed. I have stated, in the early part of the specification, that the worm wheel 155 on the cam shaft 108 is driven, through intermediate mechanism, by the motor 102, and have pointed out that the motor shaft has a gear 104 meshing with and driving a gear 105 on a worm shaft 106. I provide means by which the shaft 106 may be moved to an inactive position with the pinion 105 disengaged from that at 104 and the worm 107 disengaged from the worm wheel 155. Referring to Figures 1, 2, 3 and 43, it will be noted that the worm shaft 106 is journaled in bearings formed on the ends of parallel arms 354, 354 formed on a hub or sleeve 355. This sleeve is keyed, pinned or otherwise rigidly secured to a rock shaft 356 journaled in bearings 357 located at one side of the main column 100. At the front end of the machine, the rock shaft 356 has secured thereto a bent arm or lever 358 having a knob or projection 359, so that the lever may serve as a handle for the purpose of rocking said shaft. Within the knob there is located a locking pin 360 (shown in dotted lines in Figure 2) which may be caused to enter sockets or apertures formed in the front wall of the main column 100, so that the handle may be held with the parts either in an active or an inactive position. By oscillating the handle in one direction or the other, the shaft 106 may be moved into position so that the worm 107 and the gear 105 thereon may be caused respectively to mesh with the worm wheel 155 and the pinion or gear 104; whereas, by moving the handle downwardly, the said parts may be disengaged.

Having thus explained the nature of my said invention, and described a way of making and using the same, although without attempting to set forth all of the forms in which it may be made or all of the modes of its use, what I claim is:—

1. A machine for stringing tags having a plurality of apertures, comprising means for feeding a string and the tag into a predetermined relation, and mechanism for passing said string through the apertures in said tag.

2. A machine for stringing a tag having triangularly arranged apertures, comprising means for holding the tag and mechanism for automatically passing a string through all of said apertures.

3. A machine for stringing a tag having triangularly arranged apertures, comprising means for holding the tag and mechanism for automatically passing a string through two of said apertures, and passing the free ends of the string through the third aperture.

4. A machine for stringing a tag having triangularly arranged apertures, comprising means for holding the tag, means for feeding the string, means for passing the string through two apertures in the tag, and means for passing the free ends of the string through the third aperture.

5. A machine for stringing tags having triangularly arranged apertures, comprising means for successively feeding the tags to a predetermined position, means for feeding and cutting the string, means for passing the string through two of the apertures of the tag, and means for simultaneously passing the free ends of the string in the same direction through the third aperture.

6. A machine for stringing tags having triangularly arranged apertures, comprising means for successively feeding the tags to a predetermined position, means for feeding the string transversely across the tag to register with two of the apertures therein, means for cutting the string, needle mechanism for passing the string through said apertures, and mechanism for passing the string through the third aperture in the tag.

7. A tag-stringing machine comprising tag-holding mechanism, mechanism for feeding a string to a tag held thereby, and mechanism for passing the string through a plurality of spaced previously-formed apertures in the tag.

8. A tag-stringing machine comprising mechanism for automatically forming spaced apertures in a tag, and mechanism for passing a string through said formed apertures.

9. A tag-stringing machine comprising mechanism for automatically forming a plurality of spaced apertures simultaneously in a tag, and mechanism for automatically passing a string through said apertures.

10. A tag-stringing machine comprising mechanism for automatically forming three triangularly arranged apertures in a tag, mechanism for passing the ends of the string through two of said apertures respectively, and mechanism for passing both free ends of the string through the third aperture.

11. A tag-stringing machine, comprising mechanism for punching spaced apertures in a tag, mechanism for applying reinforcing means adjacent said apertures, and mechanism for passing a string through said apertures.

12. A tag-stringing machine, comprising mechanism for punching spaced apertures in a tag, mechanism for fastening metallic reinforcing means in said tag, and means for passing a string through said apertures.

13. A tag-stringing machine, comprising mechanism for punching spaced apertures in a tag, mechanism for inserting staples in said tag adjacent the apertures therein, and mechanism for passing a string through said apertures.

14. A tag-stringing machine comprising a magazine for holding a stack of blanks, mechanism for successively feeding the blanks from said magazine, mechanism for punching each tag, mechanism for fastening a metallic staple in said tag adjacent the punched portion thereof, and mechanism for stringing each tag.

15. A tag-stringing machine comprising a magazine for holding a stack of blanks, mechanism for successively feeding the blanks from said magazine, mechanism for punching each tag, mechanism for securing a staple in each tag adjacent the punched portion, and mechanism for stringing each tag through the punched portion.

16. A tag-stringing machine comprising a magazine for holding a stack of blanks, mechanism for successively feeding the blanks from said magazine, mechanism for punching each tag, mechanism for fastening a staple in the tag adjacent a punched portion, mechanism for feeding a string and severing a portion thereof, and mechanism for stringing said tag with the severed portion of said string by passing the string through the punched opening in said tag.

17. A tag-stringing machine comprising a magazine for holding a stack of blanks, mechanism for successively feeding the blanks from said magazine, mechanism for punching each tag, mechanism for fastening a staple in each tag adjacent a punched aperture, and mechanism for stringing said tag.

18. A tag-stringing machine comprising a magazine for holding a stack of tag blanks, mechanism for feeding the blanks successively from said magazine, mechanism for punching triangularly arranged apertures in each blank, and mechanism for passing a string through said apertures with the free ends emerging in the same direction from one of said apertures.

19. A tag-stringing machine comprising a magazine for holding a stack of tag blanks, mechanism for feeding the blanks successively from said magazine, mechanism for punching triangularly arranged apertures in each blank, mechanism for applying reinforcing means to said punched blank, and mechanism for passing a string through said apertures with its free ends emerging from one of said apertures.

20. A tag-stringing machine comprising a magazine for holding a stack of tag blanks, mechanism for feeding the blanks successively from said magazine, mechanism for punching triangularly arranged apertures in each blank, mechanism for passing a string through said apertures with the free ends emerging in the same direction from one of said apertures, and mechanism for removing each strung tag.

21. In a tag-stringing machine, mechanism for punching a tag, mechanism for stringing the tag, and mechanism for applying a staple adjacent the punched portion of said tag and clinching the ends of the staple in the tag before the tag is strung.

22. In a tag-stringing machine, mechanism for punching a plurality of apertures in said tag, and mechanism for fastening a plurality of reinforcing staples in said tag.

23. In a tag-stringing machine, mechanism for punching triangularly arranged apertures in a tag, and mechanism for fastening reinforcing members to said tag adjacent certain of said apertures.

24. In a tag-stringing machine, a punching mechanism, a stapling mechanism, a carrier for said mechanisms, mechanism for moving said carrier to different positions, and mechanism for actuating said punching mechanism and said stapling mechanism.

25. In a tag-stringing machine, a tag support, a tag-punching mechanism, a tag-stapling mechanism, means for operating said mechanisms, and mechanism for effecting a lateral relative bodily movement of said tag and said punching and stapling mechanisms.

26. In a tag-stringing machine, a punch head having a plurality of punches, a plurality of staple sets, means for feeding metallic staple strips to said sets, and mechanism for operating said punch head and said sets.

27. In a tag-stringing machine, a punch head having a plurality of punches, a plurality of staple sets, means for feeding metallic staple strips to said sets, mechanism for operating said punch head and said sets in a predetermined sequence, means for supporting a tag, and mechanism for effecting a relative movement of said tag support and said sets, whereby the staples may be fastened in predetermined positions in relation to the punched apertures in said tag.

28. In a tag-stringing machine, a pair of angularly arranged staple sets adapted to fasten angularly disposed staples in a tag, a tag support, and means for effecting a relative bodily movement of said sets and said support to present the sets successively to said tag, whereby said staples may be fastened in crossed relation to said tag.

29. In a tag-stringing machine, a pair of angularly arranged staple sets adapted to fasten angularly disposed staples in a tag, a flat tag support against which the staples are clinched, means for feeding staple strips to said sets, and mechanism for operating said sets.

30. In a tag-stringing machine, a pair of angularly arranged staple sets adapted to fasten angularly disposed staples in a tag, a flat tag support against which the staples are clinched, means for feeding staple strips to said sets, and mechanism by which said sets are operated alternately.

31. In a tag-stringing machine, a pair of angularly arranged staple sets adapted to fasten angularly disposed staples in a tag, a flat tag support against which the staples are clinched, means for effecting a relative bodily movement of said sets and said support, whereby said staples may be fastened in cross relation to said tag, and mechanism by which said sets are operated alternately.

32. In a tag-stringing machine, a carrier, a punch head thereon, a set for securing a fastener, a ram, and means for moving said carrier into alternate positions to bring said punch head and said set severally into operative relation to said ram.

33. In a tag-stringing machine, a punch head, carrying punches and having converging sides, staple sets arranged in guideways in the sides of said head, angularly arranged shear blocks for coaction with said sets in cutting staples from metallic strips, and means for feeding staple strips in opposite directions to said sets, in lines at an acute angle to the planes of the sides of said punch head and of said sets.

34. In a tag-stringing machine, a punch head, carrying punches and having converging sides, staple sets arranged in guideways in the sides of said head, angularly arranged shear blocks for coaction with said sets in cutting staples from metallic strips, means for feeding staple strips in opposite directions to said sets, in lines at an acute angle to the planes of the sides of said punch head and of said sets, and a driving ram adapted to actuate said punch head and said sets.

35. In a tag-stringing machine, a punch head, carrying punches and having converging sides, staple sets arranged in guideways in the sides of said head, angularly arranged shear blocks for coaction with said sets in cutting staples from metallic strips, means for feeding staple strips in opposite directions to said strips, in lines at an acute angle to the planes of the sides of said punch head and of said sets, a driving ram adapted to actuate said punch head and said sets, and means for effecting a transverse movement of said ram, head and sets to cause said head and said sets to register with said ram in predetermined sequence.

36. A machine for stringing tags, comprising a pair of needles adapted to thrust loops of string through spaced perforations in a tag from one side thereof, a needle for engaging said loops on the other side of the tag and thrusting them through a third perforation in the tag, and means for drawing the free ends of the string through said third perforation.

37. A machine for stringing tags, comprising a pair of needles adapted to thrust loops of string through spaced perforations in a tag from one side thereof, a needle for engaging said loops on the other side of the tag and thrusting them through a third perforation in the tag, means for drawing the free ends of the string through said third perforation, and power mechanism for causing the operation of said instrumentalities automatically in sequence.

38. A machine for stringing tags, comprising a pair of needles for forcing loops of a string located on one face of a tag through spaced perforations in a tag, fingers arranged to engage said loops and locate bights thereof in parallelism, a needle arranged to engage said bights and force loops of the string through a third aperture in the tag, and means for engaging the last-mentioned loops and drawing the free ends of the string through the said third aperture.

39. A machine for stringing tags, comprising a pair of needles for forcing loops of a string located on one face of a tag through spaced perforations in a tag, fingers arranged to engage said loops and locate bights thereof in parallelism, a needle arranged to engage said bights and force loops of the string through a third aperture in the tag, means for engaging the last-mentioned loops and drawing the free ends of the string through the said third aperture, and power-actuated mechanism for operating said instrumentalities automatically in sequence.

40. In a tag-stringing machine, means for supporting a tag, means for feeding a string across the upper face of the tag and severing a predetermined length thereof, needle mechanism for thrusting loops of said string through spaced perforations in said tag, fingers for engaging said loops and positioning bights thereof against the under face of the tag, needle mechanism for thrusting said loops through a third perforation in the tag, and hook mechanism for engaging said last-mentioned loops and drawing the free ends of the string through said third aperture.

41. In a tag-stringing machine, mechanism for fastening staples in a tag, and mechanism for automatically passing a string through said tag to lie across said staples, and then passing the free ends of the string through said tag between said staples.

42. In a tag-stringing machine, mechanism for fastening crossed staples in a tag, means for positioning a string across said staples, and mechanism for passing the string through apertures on both sides of said staples, and then back through a third aperture, to leave said ends emerging from said third aperture.

43. In a tag-stringing machine, means for positioning a tag, a string guide, a gripper for engaging the end of a string, mechanism for reciprocating said gripper transversely across said tag support comprising a flexible endless member, and means for moving said member first in one direction and then in the other.

44. In a tag-stringing machine, means for positioning a tag, a string guide, a gripper for engaging the end of a string, mechanism for reciprocating said gripper transversely across said tag support comprising a carrier for the gripper, a guideway therefor arranged transversely of the tag support, an endless flexible member connected to said carrier, wheels on which said member tracks, and mechanism for rotating said wheels alternately in opposite directions.

45. A tag-stringing machine, comprising a tag support, a pair of needles for thrusting loops of string through the tag, and mechanism for automatically drawing out and laying a string across the tag support in position to be engaged by both said needles.

46. A tag-stringing machine, comprising a tag support, a pair of needles for thrusting loops of string through the tag, mechanism for automatically drawing out and laying a string across the tag support in position to be engaged by both said needles, and mechanism for automatically severing the drawn-out length of string.

47. In a tag-stringing machine, a presser-foot, a pivoted feed table arranged to clamp a tag against said presser-foot, means for oscillating said table, and tag-feeding mechanism located on said table.

48. In a tag-stringing machine, a presser-foot, a pivoted feed table arranged to clamp a tag against said presser-foot, means for oscillating said table, tag-feeding mechanism located on said table, and mechanism for reciprocating said presser-foot toward and from said table.

49. In a tag-stringing machine, a presser-foot, a feed table arranged to coact with said presser-foot to clamp a tag, mechanism for moving one of said elements to separate them vertically, and mechanism for moving one of said elements to separate them horizontally.

50. A tag-stringing machine, comprising mechanism for stringing tags successively and tag-removing mechanism independent of the tag-stringing mechanism having means for gripping the string of the strung tag.

51. A tag-stringing machine, comprising mechanism for stringing tags successively, tag-removing mechanism independent of the tag-stringing mechanism having jaws for gripping the string of a strung tag, and mechanism for bodily moving said grippers to remove the tag.

52. A tag-stringing machine, comprising mechanism for stringing tags successively, tag-removing mechanism independent of the tag-stringing mechanism having jaws for gripping the string of a strung tag, mechanism for bodily moving said grippers to remove the tag, and mechanism for automatically opening and closing said jaws.

53. A tag-stringing machine, comprising mechanism for stringing tags successively, tag-removing mechanism having an oscillatory arm independent of the tag-stringing mechanism, jaws mounted thereon to engage the strung tag, means for oscillating said arm, and means for opening and closing said jaws.

54. In a tag-stringing machine, tag-stringing mechanism, an oscillating arm independent of said tag-stringing mechanism, rock-shafts journaled on said arm and arranged longitudinally thereof, jaws on said shafts for gripping a strung tag, mechanism for oscillating said arm, and mechanism for rocking said shafts to cause the jaws to grip and release a strung tag.

55. In a tag-stringing machine, means for holding a tag, means for engaging the string thereof to draw it out from the tag, and automatic mechanism for gripping the string and removing said tag from said tag-holding means.

56. In a tag-stringing machine, a reciprocatory carrier, two pairs of needles thereon extending in one direction, a needle thereon extending in the opposite direction, said needles being adapted to draw loops of string through a tag in opposite directions, and mechanism for reciprocating said carrier.

57. In a tag-stringing machine, a pair of spaced parallel needles adapted to carry separate loops of string through a tag in one direction, and a third needle adapted to carry loops of string through said tag in the opposite direction.

58. In a tag-stringing machine, a pair of spaced parallel needles adapted to carry separate loops of string through a tag in one direction, a third needle adapted to carry loops of string through said tag in the opposite direction, and mechanism for positioning said first-mentioned loops for engagement by said third needle.

59. In a tag-stringing machine, a pair of spaced parallel needles adapted to carry separate loops of string through a tag in one direction, a third needle adapted to carry loops of string through said tag in the opposite direction, mechanism for positioning said first-mentioned loops for engagement by said third needle, and mechanism for engaging the second-mentioned loops and drawing out the free ends of the strings.

60. In a tag-stringing machine, a pair of spaced parallel needles adapted to carry separate loops of string through a tag in one direction, a third needle adapted to carry loops of string through said tag in the opposite direction, mechanism for positioning said first-mentioned loops for engagement by said third needle, pivoted coacting hooks adapted to engage the second-mentioned loops, means for opening and closing said hooks, and means for bodily moving said hooks toward and from the tag whereby the free ends of the string may be drawn out.

61. In a tag-stringing machine, a pair of spaced parallel needles adapted to pass through a tag in one direction and carry loops of string therethrough, mechanism for drawing out a length of string and positioning it for engagement by said needles, means for severing the drawn-out length of string, a third needle adapted to pass through said tag in the opposite direction to carry loops of string therethrough, means for positioning the first-mentioned loops for engagement by said third needle, and means for engaging the loops formed by the third needle and drawing out the free ends of the string.

62. In a tag-stringing machine, the combination with a pair of needles for simultaneously carrying loops of string through a tag in one direction and a third needle for carrying said loops back through said tag in an opposite direction, of mechanism for positioning said loops for engagement by said third needle, comprising a reciprocatory carrier, and pivoted fingers thereon formed to engage said loops.

63. In a tag-stringing machine, means for locating a string across a tag, instrumentalities for engaging said string and forcing separate loops thereof through spaced apertures in the tag, and instrumentalities for engaging said loops and passing them back through said tag, and drawing out the free ends of the string.

64. In a tag-stringing machine, means for holding a tag, means for placing a length of string across said tag, means for severing said length of string, instrumentalities for simultaneously carrying the string in one direction through two spaced apertures in the tag, and instrumentalities for carrying the string in the opposite direction through said tag and drawing out the free ends of the string.

65. In a tag-stringing machine, means for holding a tag, means for placing a length of string across said tag, means for severing said length of string, instrumentalities for simultaneously carrying the string in one direction through two spaced apertures in the tag, instrumentalities for locating the string under another portion of the tag, and instrumentalities for carrying said string in the opposite direction through said tag and drawing out the free ends of the string.

66. In a tag-stringing machine, a plurality of needles arranged to project in opposite directions to carry loops of string through different portions of a tag, a head on which said needles are supported, and mechanism for reciprocating said head.

67. In a tag-stringing machine, a magazine for sustaining a stack of tags, a punching mechanism having a plurality of punches for perforating the tag, stringing mechanism for passing a string through said plurality of perforations, a tag-feeding device, and mechanism for operating said feeding device to present each tag first to the punching mechanism and then to the feeding mechanism.

68. In a tag-stringing machine, a magazine for sustaining a stack of tags, a punching mechanism having a plurality of punches for perforating the tag, stringing mechanism for passing a string through said plurality of perforations, a tag-feeding device, mechanism for operating said feeding device to present each tag first to the punching mechanism and then to the feeding mechanism, and mechanism for gripping and positively removing each tag.

69. In a tag-stringing machine, a table, a magazine thereon adapted to receive a stack of blanks, tag-stringing mechanism, a feeding device for feeding each tag to the stringing mechanism, a presser-foot for clamping each tag on the table, and mechanism for positively engaging each strung tag and lifting it from the table in the direction of the feeding movement of said tag.

70. In a tag-stringing machine, a feed table, a magazine thereon, a feeding mechanism for feeding the tags successively and longitudinally in a straight line path to each of two predetermined positions, mechanism for punching the tags when they reach one of said positions, and mechanism for looping strings through the punched apertures when said tags reach the other of said positions.

71. In a tag-stringing machine, a table, a presser-foot adapted to clamp a tag against the table, means for moving one of said elements relatively to the other to clamp and release a tag, a magazine, and feeding mechanism for feeding tags successively from said magazine to position to be clamped against the table by the presser-foot.

72. In a tag-stringing machine, a table, a presser-foot adapted to clamp a tag against the table, means for moving one of said elements relatively to the other to clamp and release a tag, a magazine, feeding mechanism for feeding tags successively from said magazine to position to be clamped against the table by the presser-foot, means for drawing a string across the tag in its last-mentioned position, means for severing the string, and means for passing the free ends of the string through a plurality of apertures in a tag.

In testimony whereof I have affixed my signature.

WILLIAM G. JOPSON.